(12) United States Patent
Kanazawa

(10) Patent No.: US 7,294,673 B2
(45) Date of Patent: *Nov. 13, 2007

(54) METHOD OF MODIFYING POLYMERIC MATERIAL AND USE THEREOF

(75) Inventor: Hitoshi Kanazawa, Fukushima (JP)

(73) Assignee: FiberMark Gessner GmbH & Co., Feldkirchen-Westerham (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/481,903

(22) PCT Filed: Jun. 28, 2002

(86) PCT No.: PCT/JP02/06588

§ 371 (c)(1),
(2), (4) Date: Jun. 17, 2004

(87) PCT Pub. No.: WO03/002641

PCT Pub. Date: Jan. 9, 2003

(65) Prior Publication Data

US 2004/0242794 A1    Dec. 2, 2004

(30) Foreign Application Priority Data

| Jun. 28, 2001 | (JP) | ............................ 2001-195995 |
| Jun. 28, 2001 | (JP) | ............................ 2001-197421 |
| Jun. 28, 2001 | (JP) | ............................ 2001-197503 |

(51) Int. Cl.
*C08L 51/00* (2006.01)
*C08F 255/00* (2006.01)
*C08J 3/28* (2006.01)

(52) U.S. Cl. ............... 525/64; 525/69; 525/263; 525/285; 525/322; 525/326.9; 525/388; 522/149; 522/150; 522/151; 522/152; 522/153; 522/154; 522/155; 522/156; 522/157; 522/158; 522/159; 522/160; 522/161; 522/162; 522/163; 522/164; 522/165; 522/166

(58) Field of Classification Search .............. 525/64, 525/69, 263, 285, 326.9, 322, 388; 522/149–166; 526/149–166
See application file for complete search history.

(56) References Cited

U.S. PATENT DOCUMENTS

| 4,202,696 | A | * | 5/1980 | Takahashi et al. .......... 430/306 |
| 4,853,253 | A | * | 8/1989 | Katoh ........................ 427/498 |
| 5,254,002 | A |  | 10/1993 | Reher et al. |
| 5,889,073 | A | * | 3/1999 | Zhang et al. ................... 522/3 |
| 6,001,894 | A | * | 12/1999 | Ottersbach et al. ......... 522/149 |
| 6,830,782 | B2 | * | 12/2004 | Kanazawa .................. 427/458 |

FOREIGN PATENT DOCUMENTS

EP     0 442 186 A1    8/1991

OTHER PUBLICATIONS

Patent Abstracts of Japan, Publication No. 59-086628 dated May 18, 1984.
Patent Abstracts of Japan, Publication No. 62-022832 dated Jan. 31, 1987.
Patent Abstracts of Japan, Publication No. 62-079235 dated Apr. 11, 1987.
Patent Abstracts of Japan, Publication No. 64-009243 dated Jan. 12, 1989.
Patent Abstracts of Japan, Publication No. 01-248460 dated Oct. 4, 1989.
Patent Abstracts of Japan, Publication No. 03-103448 dated Apr. 30, 1991.
Patent Abstracts of Japan, Publication No. 05-238186 dated Sep. 17, 1993.
Patent Abstracts of Japan, Publication No. 05-238187 dated Sep. 17, 1993.
Patent Abstracts of Japan, Publication No. 05-271445 dated Oct. 19., 1993.
Patent Abstracts of Japan, Publication No. 08-013337 dated Jan. 16, 1996.
Patent Abstracts of Japan, Publication No. 08-109228 dated Apr. 30, 1996.
Patent Abstracts of Japan, Publication No. 09-098988 dated Apr. 15, 1997.
Patent Abstracts of Japan, Publication No. 11-007937 dated Jan. 12, 1999.
Patent Abstracts of Japan, Publication No. 11-067183 dated Mar. 9, 1999.

* cited by examiner

*Primary Examiner*—James J. Seidleck
*Assistant Examiner*—Olga Asinovsky
(74) *Attorney, Agent, or Firm*—Scully, Scott, Murphy & Presser, P.C.

(57) ABSTRACT

A method of modifying a polymeric material whereby the polymeric material is modified to give a highly durable surface without decreasing its strength. Namely, a polymeric material is modified by the method comprising a combination of an impregnation step, an activation step, a step of grafting a monomer and a step of a treatment with a hydrophilic polymer. Thus, the hydrophilic nature, adhesiveness, and so forth of polymeric materials such as polyolefins can be improved without causing any decrease in the practical strength. The thus obtained polymeric materials are usable in articles with a need for high water absorptivity and high adhesiveness, for example, water-absorbing materials and water-retaining materials for medical, sanitary, cosmetic articles or supplies, agricultural materials, synthetic papers, filters and fiber products for clothes, for improving adhesiveness of composite materials and the like. Among all, these materials are particularly usable in dentition orthodontic appliances, writing implements and battery separators.

18 Claims, 2 Drawing Sheets

METHOD OF MODIFYING POLYMERIC MATERIAL AND USE THEREOF

TECHNICAL FIELD

The present invention relates to a method of modifing the property of a polymeric material. More particularly, the invention relates to a method to improve the property of a polymeric material such as a water absorption property, an adhesion property, and so forth, without decreasing its strength for a practical use. In addition, the present invention relates to the polymeric material obtained by the present method and its use thereof.

BACKGROUND ART (1) Prior Art for Modification of Surface Property of Polymeric Materials Polyolefin material, such as polypropylene and polyethylene, is excellent in lightness, strength, chemical resistance, and so forth, and is widely used for molded goods, such as a film, a non-woven fabric, and automobile parts, electrical machinery and apparatus parts. However, as polyolefin materials have a low polarity and a high crystallinity, which are derived from its chemical structure, they have a small hydrophilic property and a difficulty in chemical modification. Therefore, they have a low hydrophilic property and a difficulty in the chemical modification. Various surface activation processings such as ozonization, plasma treatment, UV irradiation processing, high-pressure electro-discharge treatment, corona discharge processing, sandblasting processing, solvent etching processing, chromium mixed-acid processing, and a flame treatment, and so forth have been tried in order to improve the hydrophilic property and an adhesive property of the polyolefin material. However, even if any method of the above processes is employed to treat the polyolefin material, we cannot obtain the material which absorbs water as much as several times of the original weight of the material.

For example, the method of improving plating nature, paint nature, and an adhesive property was examined by performing an ozone oxidation treatment (JP, 3-103448,A (1991)). However, when only the ozone treatment is employed to improve the property of the material, very severe reaction conditions are necessary and they cause the decrease in the mechanical strength, which makes that the treatment is non-practical. Furthermore, it is impossible to give a large water absorption property to the material only by the ozone treatment. In order to modify the materials by the other treatments mentioned above, the following problems are caused; the lowering in mechanical strength of the material and the high cost for facilities and a waste disposal system.

In addition to the direct activation of the surface of polymeric materials mentioned above, a method to form a layer which consists of a component with high reactivity on the surface of polymeric materials was proposed. For example, it was proposed that vinyl monomers containing ester groups were grafted to the nonwoven fabric of polyolefin fiber and then, the ester groups were hydrolyzed to form acid groups which gave a hydrophilic property and an ion-exchange property (JP, 11-7937,A (1999)). However, a grafting of sufficient amount which gives a high hydrophilic property to polyolefins is not easily attained by the vinyl monomer grafting according to the proposed method. Moreover, the method requires the hydrolysis treatment after the grafting, which causes a problem of taking time and effort.

On the other hand, a method to improve a hydrophilic property of nonwoven fabrics of polyolefin fiber by the treatment with a hydrophilic resin in the presence of a persulfate was proposed (JP,11-67183,A (1999)). Although this method gave practically a hydrophilic property to the nonwoven fabrics, the modified hydrophilic property does not give a durability in use. For instance, the hydrophilic property obtained by this method is lost considerably by washing with a hot detergent solution. In addition, when the materials such as films and casts other than a nonwoven fabric were processed, sufficient hydrophilic property could not be given, or the adhesive property by adhesives could not be improved. A method to modify a hydrophilic property of nonwoven fabrics by coating polyvinyl alcohol (JP,1-248460,A (1989)) was also known. Although the hydrophilic property of the obtained material is high, it has the problem that the durability of a hydrophilic property is not enough because the process is mere covering.

Previously, the present applicant proposed a method to improve the surface property or especially the dyeability of polymeric materials, which comprises an activation treatment of the surface of polymeric materials, a graft polymerization of monomers such as acryl amide, etc. to them or the Hofmann rearrangement of the amide groups which are contained in grafts (JP,8-109228,A (1997)). Although the polymeric materials which gave the hydrophilic property on the basis of this method can be manufactured by this method, the kind of polymeric materials which can be applied by the method is limited.

According to these methods, polymeric materials with a high water absorption property can be manufactured cheaply and easily. However, when the moldings of the polymeric materials containing additives such as a stabilizer and an antioxidant are processed to obtain a high durable hydrophilic property, these additives may reduce the effect of the activation process.

The above technical requests are desirable not only for polyolefins but also the other polymeric materials which have more active surface property than polyolefins. For example, it is sometimes requested that a surface of a polymeric material is modified to give a desirable property.

(2) Prior Art for Dentition Orthodontic Appliances

A dentition orthodontic appliance is used to correct an irregular alignment of teeth by a restitution force which is caused by an elastic steel wire (so-called arch wire) penetrating through an appliance (so-called bracket) that is bonded to a tooth. In general, a bracket is made of metal or ceramic. But, brackets made of polymers were produced recently.

In the brackets made of polymeric materials, a bracket made of polycarbonate resin reinforced by glass fiber (a PC bracket) is a typical one, and it was disclosed in a Japanese Patent (JP, No. 9-98988,A) and an U.S. Pat. No. 5254992. However, the PC bracket gives a low durability in the adhesive property to teeth and is easily polluted when it is used by fitting to teeth. In addition, it was reported that the PC bracket produces bisphenol A which is considered to give an environmental pollution. Because of these problems, it is desirable to invent a bracket made of a polymer resin which is harmless to a living body, is not polluted easily, and gives a strong adhesion force to teeth. As the present invention can improve the adhesive property of polyolefins which are known to be chemically stable, this technique should be also applied to nylon and polyester, and so forth. Therefore, the present invention can provide the dentition orthodontic appliances which are made of ideal polymeric materials. Moreover, the dentition orthodontic appliances mean not only brackets but also various appliances which are useful for a dental treatment.

(3) Prior Art for Members in Writing Implements or Painting Tools for Stationary or Makeup.

Various members such as ink-collectors (or ink-regulators), ink-tanks, ink-guiding cores, pen cores, center rods for pens, ink-absorbing materials made of fibers, ink-retaining sponges, brush heads of brush pens, and so forth are used in writing implements. Almost of these members are generally made of polymeric materials. Because, the polymeric material gives a high mechanical strength, an easy casting property, a chemical resistance, economics, and so forth. Members in writing imprements which are used to contact to water-soluble ink require a wettability to water-soluble ink, an absorptivity of the ink and an ink-retaining property. In order to overcome these requirements, a development in excellent and safety skills to improve the hydrophilic property of synthetic polymers has been expected.

One of the typical members of writing implements is an ink collector (which is sometimes called "a collector" in short below). The collector is explained in detail here. The collector is used in an ink tank of a writing implement where the ink is stored directly and it plays an ink retaining body. When an expansion of the air in an ink tank is caused by a temperature increase or a lowering of the atmosphere pressure, the ink pressured in the ink tank run through several longitudinal channels on the collector surface and then it is stored in many horizontal channels (which are called as ink-retaining channels) which are perpendicular to the longitudinal channel. Thus, the outflow of the pressured ink from air voids and nibs of pens can be avoided. When the temperature or the air pressure are recovered to the original state, it is necessary that the ink stored in the ink-retaining channels comes back to the ink tank through the longitudinal channels. When a writing implement is used for a long time, a decrease in air pressure in the ink tank is caused by a decrease in the amount of ink. As a result, when the decrease in air pressure is caused to excess, the amount of ink suitable for a good writing cannot be drawn from the nib of pens. In order to avoid this problem, the pressure in the ink tank must be kept at a given reduced pressure. Therefore, the ink collector has a mechanism that the wasted ink is substituted with the corresponding volume of air by the longitudinal channels in the ink tank. When a writing implement is equipped with an ink tank with an excellent collector whose structure is preferable for storing ink directly, we can use it with a constant amount of ink from the first writing to the final writing.

In addition, a writing implement with a collector made of synthetic resin has the following advantages. It gives a good consumption of ink as compared with the collector containing an ink absorber made of fibers; we can use the ink stored in the collector almost completely without leaving it in the ink tank. We can see the amount of ink easily through an ink tank which is made of a transparent polymer resin.

Therefore, a collector is an indispensable member for a writing implement with an ink tank. However, when an ink collector surface has an insufficient wettability to ink, the ink pressured in the ink tank cannot run smoothly into the ink-retaining channels of the collector and the retention power of the collector to the ink is too weak to keep the ink in the collector, without a capillary attraction. As a result, the ink contained in the collector goes out of the ink-retaining channels easily and the ink outflows from the air voids.

At present, an ABS resin (a three-components copolymer of acrylonitrile, butadiene and styrene) is generally used as a material for the collector, because of the strength, the casting property, the reason that the improvement of the wettability is comparatively easy, and so forth. Collectors cast by the ABS resin are treated by immersing them in strong acids or strong alkalis for several minutes to form hydrophilic groups on them in order to improve their wettability. For example, chromic mixed acid or sodium hydroxide are used as an acid or an alkali. However, the treatment has the following problems; a dangerous working and the difficulty in the treatment of waste liquid. In addition, when the washing of the collector after the treatment is not carried out completely, the following problems are considered to be caused; the waste liquid of the chemicals in the writing implement changes the quality of ink and causes a definite default in the writing implement. Although the danger in the job is high, the wettability of the ink collector to ink decreases with the elapse of time and therefore, the treatment is not satisfied well.

On the other hand, a plasma treatment was carried out to improve the hydrophilic property of ABS resin-made correctors (JP, 05-238186,A (1993)). Furthermore, a method to make a surface treatment with vinyl monomers after the plasma treatment was disclosed (JP, 05-238187,A (1993)). The plasma treatment is suitable for the surface treatment of materials with smooth surface, but it causes a defect in the treatment of correctors having concavo-convex surface because it cannot give a good result to treat the concave part of correctors.

This problem is similarly seen in the treatment of pen cores made by fiber bundles and porous materials with an ink absorptivity. Namely, it is very difficult to treat the inner part of fiber bundles and porous materials by a plasma treatment.

In addition, as the surface treatment of ABS resins is comparatively easy, an application of many general methods such as a grafting of hydrophilic monomers, an ionization radiation, a grafting by UV irradiation, and so forth is possible. However, as each of these methods has laborious processes and gives some problems in grafting such as a surface irregularity and a difficulty to obtain a controlled amount of graft polymers, it's application is not suitable for the treatment of materials such as correctors which need a precise structure.

When collectors and the other members in writing implements are cast with polyolefins such as polyethylene and poplypropylene, it is expected to give a collector with an excellent chemical resistance, a lightweight and a high-impact property and the other members of writing implement. In addition, the application of these products does not cause the environmental pollution and the toxicity of components in combustion gas which are problematic in recent years. However, it is very difficult to improve polyolefin resins by the well-known technique for hydrophilic improvement so far. Especially, as cast products of polyolefin resins should contain many kinds of additives such as stabilizers for polymer resins, chemical destaticizers, and so forth, their treatment to improve the hydrophilic property is impossible as far as the products are used as they are. Therefore, there is not an excellent method to give the improvement expected in the hydrophilic property of collectors and the other members in writing implements as described above. If the technique to improve the hydrophilic property of polyolefins including chemical stabilizers is established, its technique should be applicable for the other materials such as nylon, polyester, wool fiber, cellulose acetate, esters of polyacrylic acids, polyurethane, and so forth because the chemical treatment of these materials are easier than that of polyolefins. Therefore, the establishment of the technique for the surface modification is expected.

(4) Prior Art for Battery Separators:

Battery Separators are used to provide a smooth electromotive reaction in batteries by holding the amount of the electrolytic solution, while separating the positive electrode and negative electrode of a chemical cell and preventing a short circuit from the former. Various requirements are dependent on the kind of batteries and a lot of inventions were carried out.

For example, as the electrolytic solution of an alkaline cell is strongly alkaline, a battery separator must be an alkali-proof material. A battery separator made of polyamide non-woven fabrics used from the past has a fault that it elutes nitrogen oxides from the fiber and contracting the life of a cell by repeat use. Therefore, battery separators made of fabrics of polyolefin fibers (a bicomponent fiber is also included) such as polypropylene and polyethylene which were excellent chemical-resistant have been investigated. However, battery separators made of polyolefin materials with an excellent durable water absorption property are not seen at present.

When polyolefin fabrics with the improved water absorption property are used as battery separators, they are immersed in an aqueous sulfuric acid solution of 40 w/w % concentration in lead storage batteries, or in an aqueous solution of sodium hydroxide of 30 w/w % concentration in alkali batteries. As the charge-discharge process must be repeated in the batteries for use, the battery separators must give an excellent durability in the use for a long time as much as possible. For that purpose, a development of the method to produce hydrophilic polymeric materials excellent in chemical resistance, oxidation resistance, and so forth is desired. Further, the method which makes it possible to produce the hydrophilic polymeric material, easily, cheaply and in large quantities is desired in industry.

Although various techniques mentioned in the above "(1) Prior Art for Modification of Surface Property of Polymeric Materials" have been applied for the modification of materials for battery separators and some methods have been proposed, the materials satisfying the requirements for battery separators are not obtained.

The present invention intends to overcome the defaults in the previous methods described above and to provide a method for improving the surface property of polymeric materials which has an excellent durability without lowering the practical strength. Furthermore, the present invention intends to provide materials with water-absorption property modified for medical, sanitary, or cosmetic supplies such as disposable diapers, sanitary protection supplies, bandages, gauze, plasters with disinfectants and materials for cleaning and face cleanser pack, and so forth, brackets for dentition orthodontics, water retention materials useful for agriculture or greening in dry districts, materials for microorganism culture media, synthetic paper, filter media, medical implements (artificial organs, artificial joints, materials molded in tubes, strings and plates, and so forth) and polymeric materials with improved adhesive property and composites containing the said improved polymeric materials.

In addition, the aim of the present invention is applicable in common for all kinds of synthetic resins, regenerated fibers and natural fibers. Especially, the present invention gives a useful technique to improve polyolefins whose chemical modification is known to be difficult, and provides improved members of writing implements made of polyolefins which give the durability in the properties such as a wettability to water-soluble ink, an ink-adsorptivity and an ink-holding property.

Furthermore, the present invention intends to provide battery separators made of modified polymeric materials which give an excellent property in keeping electrolytic solutions in batteries, an alkali-resistance, an acid-resistance, a lightweight and a high mechanical strength, and intends to prepare the battery separator with the following properties cheaply and easily; that the hydrophilic treatment of the modified polymeric materials is made by real chemical bonds and that the performance data of the battery are not changed in the use for a long time, and to prepare the batteries containing these battery separators.

DISCLOSURE OF INVENTION

Figure 1:
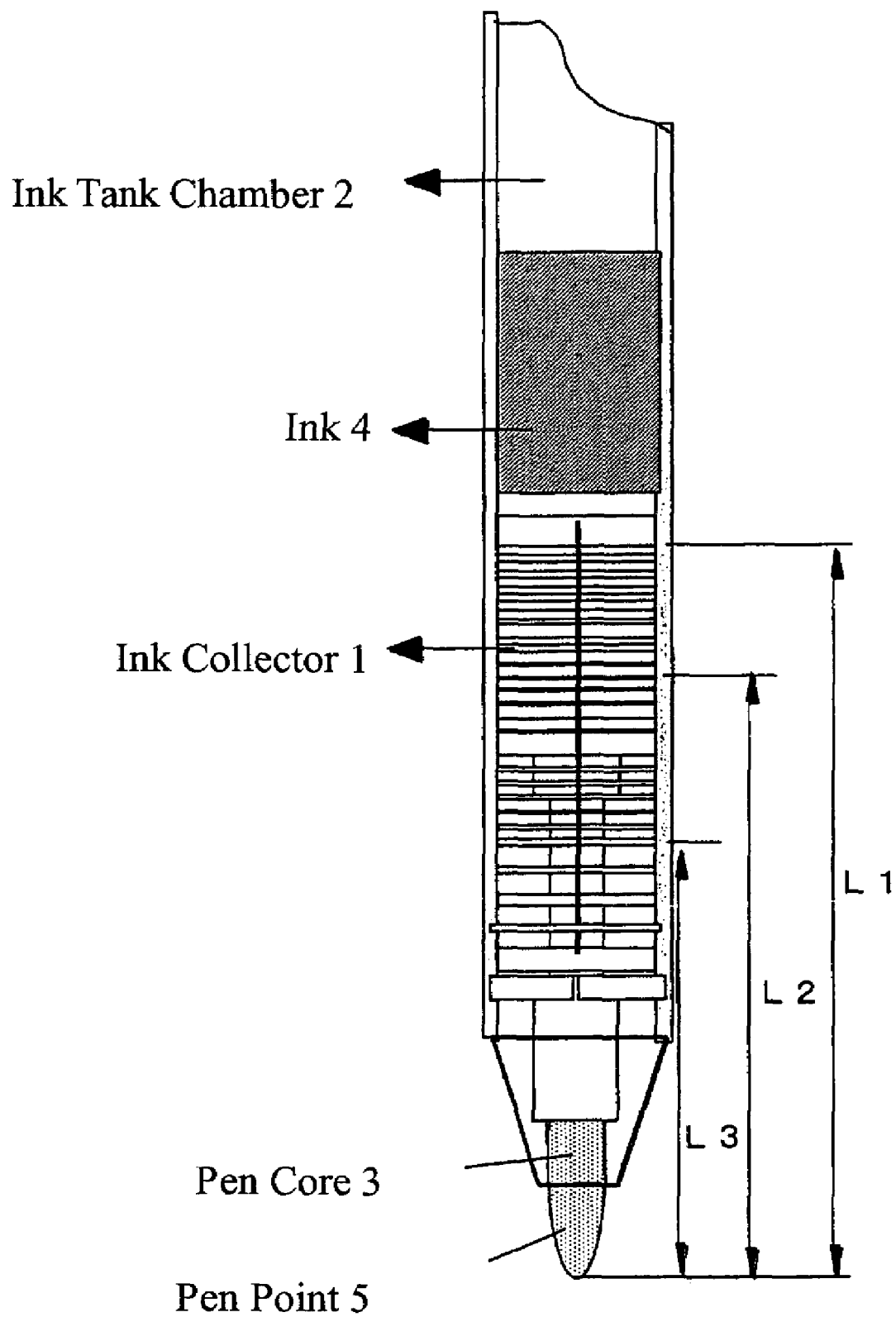
FIG. 1 gives a drawing of a longitudinal section of a writing implement of an example comprising an ink chamber filled with ink and an ink collector with a comb-teeth shaped section in which a pen core is equipped.

The present inventor investigated the method for improving the surface property of polymeric materials wholeheartedly in order to attain the aims described above and discovered that a combination of an impregnation step, an activation step, a step of monomer grafting and a step of treatment with hydrophilic polymers is effective for the improvement, and completed this invention.

Namely, the present invention relates to the method for modifying the surface of polymeric materials by the following sequential steps;

(1) subjecting the polymeric material to an impregnation step to contact the polymeric material with a single or mixture of compounds having an impregnation property to the polymeric material in the manner so that the content of the impregnated compound in the layer within the depth of 100 microns from the surface of the polymeric material is in the range of 0.1% to 40% by weight of the treated polymeric material without any substantial deformation of the polymeric material; and (2) subjecting the polymeric material produced in said impregnation step to an activation step to introduce carbonyl groups into the polymeric material; and (3) conducting a step of monomer grafting to the polymeric material produced in said impregnation step and subsequent said activation step. This method is called "Modification method 1" below.

Or, the present invention relates to the method for modifying the surface of polymeric materials by the following sequential steps;

(1) subjecting the polymeric material to an impregnation step to contact the polymeric material with a single or mixture of compounds having an impregnation property to the polymeric material in the manner so that the content of the impregnated compound in the layer within the depth of 100 microns from the surface of the polymeric material is in the range of 0.1% to 40% by weight of the treated polymeric material without any substantial deformation of the polymeric material; and (2) subjecting the polymeric material produced in said impregnation step to an activation step to introduce carbonyl groups into the polymeric material; and
(3) subjecting the polymeric material produced in said impregnation step and subsequent said activation step to a step of treatment with hydrophilic polymers. This method is called "Modification method 2" below.

Or, the present invention relates to the method for modifying the surface of polymeric materials by the following sequential steps;
(1) subjecting the polymeric material to an impregnation step to contact the polymeric material with a single or mixture of compounds having an impregnation property to the polymeric material in the manner so that the content of the impregnated compound in the layer within the depth of 100 microns from the surface of the polymeric material is in the range of 0.1% to 40% by weight of the treated polymeric material without any substantial deformation of the polymeric material; and
(2) subjecting the polymeric material produced in said impregnation step to an activation step to introduce carbonyl groups into the polymeric material; and
(3) subjecting the polymeric material produced in said impregnation step and subsequent said activation step to a step of treatment with hydrophilic polymers; and
(4) conducting a step of monomer grafting to the polymeric material produced in said impregnation step and subsequent said activation step. This method is called "Modification method 3" below.

The present invention is explained in detail below.

(Polymeric Materials)

Polymeric materials used in the present invention include the polymer material contained in each of a single polymer or a mixture of polymers, a modified single polymer or polymer mixture, a material prepared by mixing or conjugating the polymers with glass, metal and carbon fiber, and so forth. Both thermoplastic polymers and thermosetting polymers are used as synthetic polymers. Various methods are exemplified for the preparation of these polymers, and all polymers prepared by these methods can be used in the present invention. For example, the following polymers are available; (1) homopolymers or copolymers prepared by the addition polymerization of monomers selected from olefins, vinyl compounds except olefins, vinylidene compounds and the other compounds with carbon-carbon double bonds, (2) polymers prepared by the polycondensation such as polyesters and polyamides, and so forth or the mixture of these polymers or the modified polymers, (3) polymers prepared by the addition polycondensation such as phenol resin (containing Kynol (a commercial name of Japan Kynol Co., Ltd.), urea resin, melamine resin, xylene resin,and so forth or the mixture of these polymers or the modified polymers, (4) polymers prepared by the polyaddition such as polyurethane, polyurea, and so forth or the mixture of polymers or the modified polymers, (5) homopolymers or copolymers prepared by the ring-opening polymerization of cyclopropane, ethylene oxide, propylene oxide, lactone and lactam, or the mixture of homopolymers or copolymers or the modified polymers, (6) cyclic polymers prepared by the polymerization of divinyl compounds (e.g., 1,4-pentadiene) or the mixture of homopolymers or copolymers or the modified polymers, (7) polymers prepared by the isomeric polymerization; e.g., alternative copolymer of ethylene and isobutene, and so forth, (8) homopolymers or copolymers prepared by the electrolytic polymerization of pyrrole, aniline and acetylene, and so forth, or the mixture of these homopolymers or copolymers or the modified polymers, (9) polymers prepared by the polymerization of aldehydes and ketones,and so forth, (10) poly(ethersulfone), (11) polypeptides, and so forth. As natural polymers, a single material or a mixture of cellulose, proteins and polysaccharides or these derivatives, and so forth are given. In the present invention, the polymers made by the addition polymerization described above are preferably used. Monomers used in the addition polymerization are not specially limited. Homopoymers or copolymers of alpha-olefins such as ethylene, propylene, butene-1, hexene-1, 4-methylpentene-1 and octene-1, and so forth and the mixture of homopolymers and/or copolymers are expedientially used.

In the present invention, "vinyl compounds except olefins" mean the compounds containing vinyl groups. For example, the following compounds are given; vinyl chloride, styrene, acrylic acid, methacrylic acid, esters of acrylic or methacrylic acids, vinyl acetate, vinyl ethers, vinyl carbazole, acrylonitrile, and so forth. "Vinylidene compounds except olefins" mean the compounds containing vinylidene groups; vinylidene chloride, vinylidene fluoride, isobutylene, and so forth are exemplified. "Compounds containing carbon-carbon double bonds except olefins, vinyl compounds and vinylidene compounds give the following compounds; maleic anhydride, pyromellitic dianhydride, 2-butene acid, tetrafluoroethylene and chlorotrifuluoroethylene, and so forth and compounds containing two or more vinyl groups; butadiene, isoprene and chloroprene, and so forth are exemplified.

As preferable polymers prepared by the addition polymerization, homopolymers or copolymers prepared by the polymerization of two or more monomers selected from these monomers and mixtures of these polymers can be expedientially used. Especially, polyethylene, a copolymer of ethylene and the other alpha-olefins, polypropylene and a copolymer of propylene and the other alpha-olefins are preferably used. These copolymers contain both of random copolymers and block copolymers.

As this invention is effective for improving a hydrophilic property of polyolefins whose chemical modification or treatment is considered to be extremely difficult, polyolefins are preferably used.

In addition to polyolefins, polymeric materials such as homopolymers or copolymers obtained by the polymerization of one or more monomers which are selected from the group comprising vinyl compounds, vinylidene compounds or compounds containing carbon-carbon double bonds; for example, poly(methacrylic acid ester)s resin, poly(acrylic acid ester)s resin, polystyrene, polytetrafluoroethylene, copolymers of acrylonitrile (acrylic fibers and their cast materials, ABS resin, and so forth), copolymers containing butadiene (synthetic rubbers), and so forth, polyamides (containing nylon and aliphatic or aromatic polyamides), polyesters (containing polyethylene terephthalate and aliphatic or all-aromatic polyesters), polycarbonate, polyurethane, polybenzoate, polyethersulfone, polyacetal and various kinds of synthetic rubbers, and so forth are preferably used.

In addition to polymers described above, the following polymers are examplified; polyacetals, polyphenols, poly (phenylene ether)s, poly(alkyl-p-hydroxybenzoate), polyimides, poly(benzimidazole), poly-(p-phenylene benzbisthiazole), poly-(p-phenylene benzbisoxazole), poly (benzthiazole) and poly(benzoxazole), and the fibers of the following materials are preferably used; cellulose acetate, regenerated cellulose (viscose rayon, cuprammonium rayon, polynosic, and so forth), vinylon and a copolymer of vinylalcohol and vinylchloride (polychlal; a commercial name, Cordera), and so on. In addition, carbon fibers and natural fibers; vegetable fibers such as cotton, hemp, flax, ramie and jute, and so on, and animal fibers such silk and wool, and so on are also used. Moreover, the mixture or the conjugate materials containing these polymers are preferably used.

The present invention is applicable for not only the polymeric materials described above but also all kinds of polymers.

Even if the polymeric materials contain antioxidants, stabilizers, nucleation agents, flame retardants, fillers or bulking agents, foaming agents, antistatic additives, and various additives which are usually added in polymeric materials, they can be improved by the present invention. In general, the modification of polymeric materials containing the additives such as antioxidants and so on is known to be very difficult because these additives prevent the activation of the surface of the polymeric materials. In general, the existence of additives such as antioxidants and so forth in polymeric materials are considered to be not preferable for their modification, because these additives prevent the activation of the surface of the polymeric materials. Therefore, it is considered to be preferable to prepare the polymeric materials with no additives or to remove additives from the polymeric materials containing them. Contrary to this aspect, the technique in the present invention attains an effective surface modification for the polymeric materials containing additives such as stabilizers, and so forth. Therefore, this invention can be applicable for a cast polymeric material itself which is prepared by a usual method.

(Form of Polymeric Materials)

In the present invention, the form of the moldings of the polymeric materials to be improved is not especially limited. For example, fibers, woven fabrics, non-woven fabrics, cloth, a board, a film, a sheet, a pipe, a rod, a hollow container, a box, a foam and a layered product, and so forth are available. From a viewpoint of the improvement of the water absorptivity, especially moldings, such as fiber, textiles, a non-woven fabric, cloth, a film, and a sheet can be processed easily. Porous films and sheets prepared for filtration mediums or synthetic papers are easily modified to give a durable water absorption property. In addition, when the present invention is applied to the modification of the members or parts of products molded in a predetermined from, the polymeric materials which have not been used conventionally were made usable. When the other various plastic materials (volts, nuts, chains, parts of electronics, caps, covers, and so forth) are treated by the present method, their wettability and adhesion property are improved and the electrification is decreased.

As fiber or textiles, various fibers, textiles and non-woven fabrics of these fibers are preferably used. Each form of fibers is available; a fiber made of a single component, a mixture of two or more sorts of fibers, mixed fibers and a conjugate fiber (a sheath-core type, a side-by-side aligned type, a multicore type, a multi-island-in-the-sea type, a hollow-segment-pie type, and so forth).

(Members of Writing Implements)

Members of writing implements are composed of polymeric materials and their forms are given as follows; an ink corrector, an ink tank, an ink-guiding core, a pen core, a center rod in a pen, an ink-absorbing materials made of fibers, an ink-retaining sponge, a brush head of a brush pen, and a brush pen for painting colors, a brush pen for makeup, and so forth. Furthermore, a cap, an inner-cap and a plastic-made mouthpiece, and so forth are given. In addition, plastic members for sealing or fitting are given. Considering the structure of members, pen cores, ink-introducing cores, ink-retaining members and temporary-ink-retaining bodies which are made of porous materials prepared by the fusion bonding or adhesive bonding with resin particles, or pen cores, ink-guiding cores, ink-retaining members and temporary-ink-retaining bodies which are made by fusion bonding or adhesive bonding of polymer short fibers, polymer long fibers or a mixture of short or long fibers of polymers.

(Battery Separators)

Preferable forms of polymeric materials for preparing battery separators are given as follows; non-woven fabrics, porous sheets, porous films, non-woven fabrics, board-like composites containing fibers, cloths, and so forth. In order to prepare separators for alkali batteries, non-woven fabrics having a pore size of 1 to 200 microns, a vacancy of 30 volume % to 80 volume %, a thickness of 20-500 microns, a fiber diameter of 0.1-100 microns and a density of 5 $g/m^2$ to 100 $g/m^2$ are preferably used. Using these materials, battery separators which give a high wettability to electrolytic solutions, a high retaining property of electrolytic solutions, a good permeability for oxygen generated from the positive electrode in the course of an electric charge and an excellent strength can be produced. In addition, as separators for lead-storage batteries, a composite which is prepared by bonding a coarse glass-fiber sheet with polyolefin fibers by the thermal fusion bonding or adhesive resins is preferably used. Battery separators for the lead-storage battery as acid batteries require an appropriate thickness, a high strength and a high retaining property of electrolytic solutions. Considering these conditions, non-woven fabrics having a pore size of 1 to 200 microns, a vacancy of 30 volume % to 80 volume %, a thickness of 500 microns to 1200 microns, a fiber diameter of 0.1-100 microns and a density of 100 $g/m^2$ to 300 $g/m^2$ are preferably used.

Each of modification method relating to the present invention is given below.

(Washing)

It is preferable to wash the surface of polymeric materials to remove some impurities with an appropriate liquid before the processing. For example, polyolefins, polyvinylchloride, polyvinylidene chloride, and so forth are washed preferably with toluene. Cellulose acetate, nylons, polyesters, polystyrene, acrylic resins, polyvinyl acetate, polycarbonate and polyurethane, and so forth are washed preferably with alcohols. Cellulose derivatives such as viscose rayon and cuprammonium rayon, and so forth are washed preferably with an aqueous soap solution first and with alcohols later.

(Impregnation Step)

The impregnation step is carried out by touching the polymeric materials to the compounds which are impregnated in them at a temperature under the softening point of the polymeric materials; the said compounds having affinity to polymeric materials are used as they are or as solutions or dispersants. In this step, polymeric materials give no essential deformations. The compounds used for this aim are called as "impregnants". This impregnation step is explained as follows; the impregnants permeate in the crystal region of the polymeric materials and make very small interstices in the materials. This step has a role to proceed the subsequent activation step and grafting step. The impregnants contained in the polymeric materials can be removed by washing after the subsequent steps.

The preferable range of the amount of impregnants in the polymeric materials are given as follow; 0.1-40 weight % for the polymeric materials whose thickness is below 1000 micron and the content in the region of the materials within 1000 micron depth from the surface is 0.1-40 weight % for the polymeric materials with a thickness of over 1000 micron. In the case of the polymeric materials with a thickness of boards or a diameter of rods are below 20 mm, the impregnating content is preferably 0.1-10 weight %.

(Impregnants)

As impregnants, each of compounds with an affinity to the polymeric materials are used; inorganic or organic compounds and gaseous, liquid or solid compounds are similarly useful. Liquid impregnants can be used as they are or their mixtures are used as solutions or dispersions prepared by mixing with the other liquids. When the impregnants are solid, they are used as solutions, dispersions or emulsions by mixing with the other liquids. When the impregnants are gaseous, they are used as they are. The impregnants in the present invention contain a so-called solvent. However, the kind of impregnants is not limited to this.

Impregnants are usually selected by considering the kind of polymeric materials which are processed. Compounds used in the carrier dyeing of synthetic fibers, especially polyesters or commercial carriers are preferably used. In addition, a lot of compounds corresponding to the carriers can be used. These compounds can be widely useful for not only polyesters but also polyolefins, polystyrene, polyacrylate resins, polyurethane, and so forth. Diphenyl, ortho- or para-hydroxybiphenyls, the other derivatives of diphenyl, sodium salicylate or its derivatives, halogenated aromatic compounds (for example, mono-, di- or trichlorobenzene), and so forth are exemplified. These compounds can be used as solutions in organic solvents such as hexane, methanol, and so forth, dispersions in water or emulsions containing surfactants.

Moreover, liquids of organic compounds which have the compatibility to the polymeric materials can be also used as impregnants. As a matter of convenience, the following requirement is useful to decide an impregnant for a polymeric material; a single compound or a mixture of plural compounds selected from the liquids of organic compounds whose solubility parameters (SP) are close to those of the polymeric materials which are treated. It is preferable that a polymeric material is treated with a solvent whose difference of the solubility parameter from that of the polymeric material is in the range of −2 to +2. When the difference of SP between a solvent and a polymeric material is smaller than this range, the polymeric material must be treated very quickly with the solvent at temperature much lower than usual room temperature. The solvent does not dissolve the polymeric material but it should be only impregnated into the surface of it. When an organic solvent dissolves a polymeric material at high temperature, it can be used for a short time at low temperature where the polymer is not dissolved by the solvent. As examples of liquid impregnants, toluene, xylene, decalin, tetralin, cyclohexane and a mixture of dichloroethane and ethanol (1:2, volume ratio),and so forth are useful for polypropylene, a mixture of toluene and methanol (1:10, volume ratio), and so forth are useful for polystyrene and a mixture of phenol and hexane (1:10, volume ratio), and so forth are useful for polyethylene terephthalate.

Conditions for the impregnation step such as temperatures, times, and so forth are selected preferably by considering the form or shape of the polymeric materials to be treated. We can select the appropriate conditions for the aim of the treatment. For example, when a non-woven fabric composed of polyolefin fibers with a diameter of 5-19 micron is treated, it is immersed in an impregnant (for example, toluene) for two minutes at room temperature and the impregnant in the fabric is removed by a centrifugal separator (a rotation rate: 500-2000 rpm). When the surface of the polymeric material seems dry, the impregnation process is finished. In the treatment of films, boards and cast materials (a thickness about 2-5 mm) made of polyolefins, the material is immersed in an impregnant for 5-30 minutes at from room temperature to 70° C. and the impregnant is removed similarly to the manner mentioned above. The weight increase in the polymeric material through the impregnation step is about 1-10 weight %.

In the impregnation step of wool fiber, it is immersed in a mixture of an aqueous solution of sodium carbonate and methanol for 1-10 minutes at room temperature, and the material is rinsed with methanol and the impregnant is removed by a centrifugal separator.

The present impregnation step is useful for the treatment of molded materials with a small surface area such as films and boards or materials which contain a lot of antioxidants and the other additives.

(Activation Treatment Step)

In the present invention, the activation treatment step means the treatment to introduce carbonyl groups into the surface of materials. In addition to carbonyl groups, the activation treatment process gives the introduction of functional groups or unsaturated bonds containing oxygen or nitrogen, and so forth to the materials. A preferable activation treatment process is each of treatments such as a plasma treatment, an ozone treatment, an ultraviolet light irradiation, a corona discharge, a high-voltage electric discharge, and so forth. Well-known facilities are available for the aim of the present invention. The extent of the activation treatment is appropriately controlled by considering the aim of the treatment. An introduction of a trace amount of carbonyl groups in polymeric materials is a preferable activation treatment for the present invention. Generally, activation treatments which were proposed so far are too hard to attain the aim of the present invention. As an indication of the activation treatment, an infrared spectroscopy (IR) of treated polymeric materials is effective to observe the extent of the activation treatment. For example, a ratio of the absorbance due to carbonyl groups introduced in materials to that due to the crystalline region which is not changed by the treatment is estimated by the base line method and the result is used to see the extent of the oxidation by the activation treatment.

For example, in the case of polypropylene, it is preferable that the ratio of the absorbance at around 1710 $cm^{-1}$ due to the carbonyl groups introduced in the polymer to the absorbance at around 973 $cm^{-1}$ due to the methyl groups unchanged in the crystalline region is about 0.2 or less.

A preferable method to determine the conditions of the activation treatment is as follows: the relationship between a treatment time and an absorption due to introduced carbonyl groups in the activation of objective materials is previously observed and their relational expression is estimated. The condition of the activation treatment which does not give a decrease in strength of the treated material is determined from the relational expression. When a decrease in the strength is observed for the treated material even if the infrared spectroscopy indicates only the existence of a trace amount of carbonyl groups which is in a limit of the IR measurement, the appropriate treatment time can be estimated by the extrapolation from the relational expression in the region which cannot be observed by IR. In this way, an effective activation treatment for materials which gives no decrease in the strength can be attained.

(Ozone Treatment)

The ozone treatment is carried out in order to cause a chemical reaction, mainly oxidation of the surface of polymeric materials by contacting ozone molecules to the polymeric materials. The ozone treatment is performed by exposing polymeric materials to ozone. Any methods of the exposing procedures can be available; for instance, to put a polymeric material under an ozone atmosphere for a given time, to expose a polymeric material in a stream of ozone, and so forth. Ozone can be generated by supplying air, oxygen, or gas containing oxygen such as oxygen-added air, and so forth to an ozone generator. The ozone treatment is carried out by introducing the obtained gas containing ozone into a reaction vessel or a container in which polymeric materials are involved. The conditions of ozone treatment such as a concentration of ozone in a gas containing ozone, an exposure time, temperature, and so forth are appropriately determined by considering a kind and a form of a polymeric material and the aim of the surface modification.

Generally, a stream of oxygen or air with a flow rate of 20 ml/min.–10 L/min. is used to generate ozone with a concentration from 10 $g/m^3$. to 200 $g/m^3$., and polymeric materials are treated in it at temperature from 10° C. to 80° C. and a reaction time from 1 minute to 10 hours.

For example, the treatment with an ozone concentration from 10 to 40 $g/m^3$ and a time from about 10 to 30 minutes at room temperature is available for the treatment of polypropylene fibers or polyvinyl chloride fibers. When the specimen is a film, an appropriate ozone treatment is carried out with an ozone concentration from 10 to 80 $g/m^3$ for the time from about 20 minutes to 3 hours at room temperature. When air is used instead of oxygen, the ozone concentration becomes about a half of that with oxygen.

It is considered that hydroperoxide groups (—O—OH), and so forth are introduced to the surface of polymeric materials by the reaction, mainly oxidation, using the ozone treatment and some of them are considered to be changed to hydroxide groups or carbonyl groups.

(Plasma Treatment)

A plasma treatment is carried out to introduce functional groups containing oxygen, nitrogen, and so forth to the surface of materials; a polymeric material is put in a vessel containing a gas such as argon, neon, helium, nitrogen, carbon dioxide, oxygen and air, and so forth and the material is exposed to the plasma generated by a glow discharge. It is considered that radicals are generated on the surface of the polymeric material by the attack of the plasma. Subsequently, the radicals are exposed to air and reacted with oxygen to form carboxylic groups, carbonyl groups, amino groups, and so forth are considered to be produced on the surface of the polymeric material. Furthermore, the plasma treatment under a low pressure of nitrogen, oxygen or air can produce functional groups directly on the polymeric material. Methods of the electric discharge for the generation of plasma are classified in (1) a direct current discharge, (2) a radio-wave discharge, (3) a microwave discharge, and so forth.

(Ultraviolet Light Radiation Treatment)

An ultraviolet light radiation treatment is a method to irradiate an ultraviolet light (generally expressed by UV, or UV light in short) to the surface of polymeric materials. Low-pressure mercury lamps, high-pressure mercury lamps, super high-pressure mercury lamps, xenon lamps, metal halide lamps, and so forth are employed as a UV light source. It is effective that a polymeric material is treated with a solvent which can absorb UV light before the UV irradiation. Although any wave length of UV light is available, that of around 360 nm or a little less is preferable to avoid the degradation of the material. When a UV light is irradiated to a polymeric material, a part of the light is absorbed by several chemical structures such as double bonds, and so forth in the surface region of the polymeric material and the absorbed energy should break some chemical bonds to form radicals. The resulting radicals are considered to form carboxylic groups or carbonyl groups via peroxides by the reaction with oxygen in air.

(High Electric Voltage Treatment)

A high electric voltage treatment is as follows. A polymeric material is put on a belt conveyor roller equipped in a tunnel-shaped implement and the material is put on the belt. A high voltage such as several hundred thousands volts is charged between many electrodes equipped in the inner wall of the implement and the electric discharge was made in air. It is considered that the electric discharge activates oxygen in air and the surface of the material and that the oxygen included in the material surface forms polar groups in it.

(Corona Discharge Treatment)

A corona discharge treatment is as follows. A polymeric materials is laid on a metal roller which is grounded, and a high voltage such as several thousands volts is added between the metal roller and the knife-shaped electrodes which are aligned with intervals of several mm distance against the metal roller. A corona discharge is generated between the metal roller and the electrodes in air and a polymeric material is passed through the space between the metal roller and the electrodes. This method is suitable for films or thin materials.

The methods except the ozone treatment are based on an energy irradiation. When a polymeric material has a part which makes a shadow for the irradiation, a technique is necessary to treat the shadow part by the irradiation. Therefore, the ozone treatment is preferable for the treatment of materials such as a non-woven fabric and a fiber-assembled material which give shadow parts derived from the material's structure. Besides, the ozone treatment is economical and preferable because of the economical equipment.

(Monomer Grafting Treatment)

In the present invention, monomers used for grafting are not limited as far as they are graft polymerizable compounds; compounds with at least one carbon-carbon double bond, for instance, vinyl compounds or similar compounds to them are preferable. Hydrophilic monomers are more preferable among monomers. As hydrophilic monomers, at least a single monomer or a mixture of monomers selected from the following group are preferably used; acrylic, acid, methacrylic acid, vinyl acetate, 2-butene acid, ethylene sulfonic acid, hydroxyalkyl acrylate, hydroxyalkyl methacrylate, acryl amide, vinyl pyridine, vinyl pyrrolidone, vinyl carbazole, maleic anhydride and pyromellitic dianhydride. In the present invention, the use of acrylic acid or methacrylic acid is especially preferable because their polymer give a high chemical resistance and a high water absorption property.

In addition, as vinyl monomers whose hydrophilic properties are less than hydrophilic monomers, the following monomers are also available; esters of acrylic acid, esters of methacrylic acid, vinyl acetate, styrene, and so forth. A use of only hydrophilic monomers is preferable, but, sometimes, a use of a mixture of hydrophilic monomers with low hydrophilic monomers is effective for increasing the amount of grafting, as a result, the hydrophilic monomer residues contained in the grafts on the polymeric materials can indicate a hydrophilic property.

As the methods of monomer grafting, each of the following methods is available; (1) a method to carry out the monomer grafting in the presence of catalysts or initiators (the general term is given as "initiators" below), (2) a method to carry out the monomer grafting by heating in the presence or absence of catalysts or initiators, and (3) a method to carry out the monomer grafting by UV irradiation in the presence or absence of catalysts or initiators.

The following initiators are exemplified; the combination of peroxides (benzoyl peroxide, t-butylhydroxy peroxide, di-t-butylhydroxy peroxide, and so forth.), cerium ammonium nitrate (IV), persulfates (potassium persulfate, ammonium persulfate, and so forth.), oxidation-reduction initiators (oxidants: persulfates, hydrogen peroxide, hydroperoxide, and so forth., and inorganic reductants: copper salts, iron salts, sodium hydrogen sulfite, sodium thiosulfate, and so forth, and organic reductants: alcohols, amines, oxalic acid, and so forth., and then the combination of the oxidants: hydrogen peroxide and so forth, and inorganic reductunts: copper salts, iron falts, sodium hydrogensulfite, sodium thiosulfite, and so forth, or organic reductants: dialkyl peroxides, diacyl perozides, and so forth, and reductants: tertiary amines, naphthenates, mercaptans, organometallic compounds (triethyl aluminium, triethyl boron, and so forth), the other usual well-known initiators for radical polymerization, and so forth.

When acrylic acid is used as a monomer, a water-soluble initiator such as cerium ammonium nitrate (IV) or potassium persulfate, and so forth. are preferably used. A water-insoluble initiator such as benzoyl peroxide or N, N'-azobisisobutylonitrile (AIBN) is dissolved in methanol or acetone and the obtained solution is used after being mixed with water. In the grafting by a UV irradiation, a photo-sensitizer such as benzophenone, hydrogen peroxide, and so forth can be used, in addition to the initiators mentioned above.

A monomer grafting is carried out by general grafting methods. Namely, the monomer grafting can be attained by the reaction in each of liquid phase, gaseous phase and solid phase.

When a water-soluble initiator is used, an appropriate amount of the monomer necessary for the treatment is dissolved in water. If a water-insoluble initiator is used, it is dissolved in an organic solvent such as alcohols, acetone, and so forth which are miscible in water, and the solution of the initiator is mixed with an appropriate amount of water, taking care not to precipitate. A polymeric material treated by an activation step or a step with a hydrophilic polymer explained below is put in a solution of an initiator, and its monomer grafting is carried out by adding a monomer in the mixture. The atmosphere in the reaction vessel is substituted by nitrogen if necessary. When a thermal grafting is carried out, the reaction mixture is heated for a given time at a given temperature. Furthermore, when a monomer grafting is carried out by a UV irradiation, a UV irradiation is made to the reaction mixture for a given time at a given temperature. UV lamps are not limited by special ones. A high pressure mercury lamp (for example, a lamp, H400P produced by Toshiba Co., Ltd.) can be used. UV light with wavelength of about 360 nm monochromated by a filter is applicable, but UV light with a whole wavelength range generated by a UV lamp can be also used.

When a monomer for grafting is a volatile compound, the vaporized monomer can be used for the grafting. Namely, a polymeric material which was pretreated is put in a sealed reaction vessel and a volatile monomer (for example, methyl methacrylate, styrene, and so forth.) is injected into the vessel. The reaction vessel containing the reaction mixture is evacuated to a given reduced pressure and the monomer is gasified in it. The reaction vessel is then made by a UV irradiation and the monomer grafting is attained.

When a vinyl monomer containing amide groups is used as a monomer for the grafting, the Hoffman rearrangement to the graft polymer obtained in the polymeric material is preferably used according to the method as described in JP,H8-109228, A(2006) by the present applicant.

(Hydrophilic Polymer)

The polymeric materials modified by the method of the present invention are improved in the following properties; by the method of the opreIn the present invention, "hydrophilic polymers" represents water-soluble polymers or polymers which do not dissolve easily in water but have a hydrophilic property. Specific examples of polymers are as follows; poly(vinyl alcohol), sodium carboxymethyl cellulose, ethylene-vinyl alcohol copolymer, poly(hydroxyethyl methacrylate), poly(alpha-hydroxy vinyl alcohol), poly (acrylic acid), poly(alpha-hydroxy acrylic acid), poly(vinyl pyrrolidone) and poly(alkylene glycol)s such as poly(ethylene glycol) and poly(propylene glycol), and so forth. In addition, these sulfonates can also be available. In addition, sodium arginate, starch, silk fibroin, silk sericin, gelatin, various kinds of proteins, polysaccharides, and so forth are exemplified.

(Step of Hydrophilic Polymer Treatment)

When a step of hydrophilic polymer treatment is carried out to a polymeric material which have been treated by an activation step, it is preferable to attain the step in the presence of catalysts or initiators. The catalysts or initiators used in "the monomer grafting" described above are similarly used in the step of hydrophilic polymer treatment.

In the step of hydrophilic polymer treatment, it is preferable to use an aqueous solution of a hydrophilic polymer. A water-soluble polymer is used as an aqueous solution. If a hydrophilic polymer is not soluble easily in water, it can be used as a solution in an appropriate solvent. The use of water-soluble polymers is explained below.

When a treatment with a water-soluble polymer is carried out in the absence of an initiator, a polymeric material treated by the activation step is put in an aqueous solution of the water-soluble polymer.

When a treatment with a water-soluble polymer is carried out in the presence of an initiator, at first, an aqueous solution of the water-soluble polymer is prepared. Then, if the initiator is water-soluble, a given amount of it is dissolved in the aqueous solution of the water-soluble polymer. If the initiator is not dissolved in water, it is dissolved in an organic solvent such as alcohols, acetone, and so forth which are miscible with water, and then, the solution is added in the aqueous solution of the water-soluble polymer. Then, a polymeric material obtained by the activation treatment is put in the solution of the water-soluble polymer and the initiator. The inner atmosphere of the reaction vessel is desirable to be substituted with nitrogen gas, but the nitrogen atmosphere is not always necessary for attaining the process simply.

The temperature is not limited for the treatment with a water-soluble polymer and an initiator; usually, the temperature from 10° C. to 80° C. is available, but that from 60° C. to 90° C. is preferable. The treatment for a long time (for example, about 12 hours) at a high temperature is also carried out in order to obtain a durable hydrophilic property to a polymeric material.

(Uses)

Polymeric materials modified by the method of the present invention give the extremely improvement in the properties as follows; water absorption property, water retention property, adhesion property, chemical resistance, and so forth. These results can be available for many applications. As an adhesion property of a polymeric material is improved, for example, it can be bonded to paper, wood, metal, and so forth, using general adhesives such as starch, poly(vinyl acetate), epoxy resin, poly(cyanoacrylate), and so forth. The present invention is applicable for various materials which need an adhesion property. Furthermore, As the present invention is used for the improvement of polyolefins such as polypropylene and polyethylene whose improvement is known to be difficult, it can be applied to modify the other many kinds of polymeric materials. To non-woven fabrics of polyolefin or that of a mixture of polyolefin and another polymer, a water absorption of 7 to 10 times as much as the original weight is given by this method. In addition, the improved materials give a good adhesion property and resistances to alkalis, acids and oxidants. Each of typical applications is described below, but the use of the present invention is not limited to these applications.

(1) Tools or Materials for Wiping or Cleaning: at present, as a disposable wiping or cleaning material for a family use is made by the following procedure and is marketed; as a main basic material, a mixture of polyester fiber, polyolefin fiber, and the other synthetic fiber is prepared, and further, a rayon fiber is mixed with them to give a hydrophilic property and then, a surfactant is impregnated to the mixed fibers. If this disposable cleaning material is produced using the materials prepared by the method of the present invention, the product gives a lightweight, a high strength, a high absorption property of water or an aqueous surfactant solution, and a high durability for use. It can be used repeatedly several times by rinsing with water.

(2) Water Absorptive Materials: materials with a water absorption property prepared by the present invention are represented.

(3) Water Retention Materials: a hydrophilic polyolefin non-woven fabric prepared by the present invention is useful for a water retention material which is available for supplying water to plants. To prepare a water retention material, the material of clothes, non-woven fabrics, fibers, and short-cut fibrous waste products are available. Fibers with a diameter of from 10 microns to 500 microns are preferably available.

(4) Medical, Sanitary or Cosmetic Supplies: disposable materials useful for medical, sanitary, or cosmetic articles are represented. Diapers, sanitary protections, bandages, gauze, sanitary napkins, disinfecting patches or tapes, the other medical implements, cosmetic supplies or materials for cleaning, cleansing, face packing, makeup, padding, and so forth are exemplified.

The inner part of disposable diapers or sanitary protections contains materials having a water retention property which are made of pulp, starch, polyacrylic acid, and so forth and the outside part of them is covered with a material having a water repellency which prevents the passing of urine, water, blood, and so forth.

Water which is generated from a body is passed through the inner hydrophilic non-woven fabric and the water is absorbed in the materials with a water retention property. A hydrophillc polypropylene is the most preferable material, because it is strong to water and not broken easily. However, the hydrophilic non-woven fabric used in an inner material is prepared only by dipping a non-woven fabric in an aqueous solution of a surfactant or a water-soluble reagent. The product prepared in this way should have no durability to washing; the additive is easily removed by rinsing with water. In addition, the effect of a surfactant to skins may be a problem to be worried. Thus, a development to prepare a polymeric material with a hydrophilic property, cheaply and easily is desired. Polyolefin materials improved in a water absorption or retention property which are prepared by the present invention are the most favorable materials for the inner sewing cloth of the disposable diapers and sanitary protections. In addition, polymer materials with a high water absorption property which are prepared by the present invention are also available for the water absorption material used in an inner pad of disposable diapers or sanitary protections. The hydrophilic material obtained by the present invention gives a lightweight, a mechanical strength, a safety, and a durability for repeating uses. In addition, as the polymeric material having a hydrophilic property or a water absorption property which is obtained by the present invention is lightweight and strong, and it can be impregnated with detergents, chemicals, adhesives and so forth, it is available for gauze, a fiber product for wiping, disinfecting cloth patches or tapes, and the other cosmetic articles or supplies. When they are used for disposable medical, sanitary, or cosmetic articles or supplies, a preferable material form is a cloth or a non-woven fabric, and its unit weight and thickness of the material are appropriately selected. However, a fiber in cloth or a non-woven fabric with a diameter of a range of 1 micron to 500 microns are used easily.

(5) Internal Materials for Clothes, Beds, and Bedclothes: the polymer materials having a hydrophilic property or a water absorption property obtained by the present invention are lightweight and mechanically strong. When their water absorption ability is controlled in a preferable extent, they are suitable for fiber products of clothes and an inner material for beds and bedclothes.

(6) Filter Mediums: filters of porous films made of hydrophobic materials such as polyolefins, polysulfone, a polyester, and so forth, have a mechanical strength and a low hydrophobic property as compared with paper filters. They are not available for the filtration of aqueous solutions because of the low hydrophilicity. At present, they are coated with surfactants or water-soluble polymers in order to improve the hydrophilicity. However, the hydrophilic portions of these filters is non-durable and is easily dissolved in water in the course of the filtration. When the hydrophilic treatment of the present invention is applied for the filter mediums, the filter mediums with a durable water absorption property can be obtained.

(7) Materials for Microbial Culture Mediums: as water retention materials obtained by the present invention give a high water absorption property, a high mechanical strength and a high microbial fertility, they are suitable for the materials for a microbial culture medium. Various forms of materials such as clothes, non-woven fabrics, fibers and cut disposable fibers are available. A diameter of component fibers in these materials is preferably from 10 microns to 500 microns.

(8) Dental Treatment Appliance: the treatment method of the present invention can modify the adhesion property of polymer materials which constitute materials for dental treatment. As the present treatment method can be available for various materials which need a good adhesion property, composite materials and fibers used in fiber-reinforced plastics, it is also useful for the improvement of the adhesion property of a plastic appliance for dentition orthodontics (for example, brackets) and the other appliances for dentition orthodontics.

(9) Members of Writing Implements: as the treatment method of the present invention can be applicable for usual resins such as polyolefin resins, nylon, polyester, polyurethane, and so forth, it is applied to improve the property of members in writing implements for stationery products, cosmetic implements, tools, and so forth. The following writing implements which need a wettability to ink, an ink-absorbing property and an ink-retaining property are exemplified; an ink collector, an ink tank, an ink-guiding core, a pen core, a center rod in pens, an ink-absorbing materials made of fibers, an ink-storage sponge, a head of brush pen, a brush pen for painting colors, a brush pen for makeup tools, and so forth.

(10) Materials for Medical Supplies or Instruments: artificial blood vessels, artificial organs, artificial joints, and tube-, thread- or plate-like polymeric materials, and so forth. are exemplified. For example, medical supplies which are used by touching to human bodies or human organisms (catheters, tubes or other items for draining), body fluid absorbing materials, contact lenses, lenses for goggles, bandages of synthetic fibers, gauze and instillation accessories are given.

(11) Polymeric Materials Composites: the adhesion property of fibers which are used in polymer composites or fiber-reinforced plastics is improved by the present Invention. The obtained fiber is used to produce polymeric materials composites with a high strength.

(12) Synthetic Papers: synthetic papers made of polymic materials, such as polyolefins (polyethylene, polypropylene, and so forth.), polyesters and so forth,. are whitened by adding air bubbles or fillers, and they are used as the substitute of papers. The modification of the hydrophilic property of the surface by the present invention can improve an adhesion property and a printing property of synthetic papers.

(13) Materials with Improved Adhesion Property: in addition to the modification of the adhesion property of materials for various uses as described above, the present method can modify the adhesion property of various kinds of polymer films or mold products, and an adhesive property with a homotypic or a different material can be improved.

(14) Application of Hydrophilic Film: the present invention gives a high hydrophilic property to polymer films of polyolefins, polyester, and so forth. For example, as a water-absorption polyester film obtained by this invention gives a good adhesion property and a wettability to water, the antifog effect is acquired by sticking on glass or a mirror.

(15) Use for Battery Separator: battery Separators produced by the method of the present invention give not only a high physical strength but also high chemical resistances to alkalis and acids. They give also a high absorption rate of various kinds of electrolytic solutions and a high retention ability of them. Therefore, they can be useful for each of primary batteries and secondary batteries. They can be used in batteries with any shapes such as tubes, buttons and flat forms, and used in both of open cells and closed cells when they are secondary batteries.

As primary batteries, an alkali-manganese battery using an alkaline electrolytic solution, a mercury cell, a silver oxide cell, an air cell, a silver chloride cell, a lithium battery and a manganese battery using an acid electrolytic solution, and so forth are exemplified. As secondary batteries, an alkaline storage battery using an alkaline electrolytic solution (an Edison battery), a nickel-cadmium battery (a Jungner battery), a nickel-hydrogen battery, a lead storage battery using an acid electrolytic solution, and so forth are exemplified. Battery separators prepared by the present invention can be used instead of paper-made battery separators which have been so far used in batteries.

Best Methods for Carrying Out the Invention

EXAMPLE

Although this invention is explained by indicating examples below, this invention is not limited to these examples and interpreted. In order to explain the excellent effect of the present invention, the examples are compared with comparative examples.

Materials, reagents and tests or evaluation methods used in examples and comparative examples are given below.

(A) Materials containing polymeric materials (1) Polymeric materials used in examples and comparative examples are listed in Table 1. Any manners to remove antioxidants, stabilizers and the other additives in the materials were not carried out. Abbreviations for words used here are given as follows. PP: polypropylene, PE: polyethylene, PET: polyethylene terephthalate, PSU: polysulfone, PP/PE or P/E: a mixture of polypropylene and polyethylene, and HPDE: high-density polyethylene.

(2) Materials for dental treatment : orthodontic brackets (size 2.23×3.0×3.8 mm), which are made of polypropylene (each weight: about 31 mg) or a nylon 12 (with a weight of about 32 mg) are reinforced with aluminum metal fittings.

(3) As members of writing implements or writing and painting tools for makeup, the following various kinds of materials are used.

1) A PP collector with a cross section of a comb-like shape: a polypropylene-made ink collector with a cross section of a comb-like shape. This has a structure which is composed of two tubes; one tube with comb-teeth gives an outside diameter 6 mm and an inside diameter 2 mm. The other tube is a cylinder with an outside diameter 6 mm and an void diameter 4 mm. It's weight is 0.61 g and the length is 28 mm. This collector is called as "PP collector 1" in short. Its shape is shown by FIG. 1.

2) PP collector made by a laminate of sheet bodies : a polypropylene-made disc whose center is cored and has an embossed surface (a number of embosses on a disk is 40) is prepared. A laminate of several number of the sheet bodies is used as an ink collector. The distance between each of sheet bodies is given by the height of the embosses on the disk. The disk gives a weight of 0.055 g. This collector is called as "PP collector 2" in short.

3) ABS collector with a cross section of a comb-like shape: an ink collector made of ABS resin (a copolymer of acrylonitrile, butadiene and styrene) whose crosss section is a comb-like shape. and its weight is 0.61 g and the length is 28 mm. This collector is called as "ABS collector 1" in short.

4) ABS collector made by a laminate of sheet bodies: an ABS resin-made disc whose center is cored and has an embossed surface (a number of embosses on a disk is 40) is prepared. A laminate of several number of the sheet bodies is used as an ink collector. The distance between each of sheet bodies is given by the height of the embosses on the disk. The disk gives an outside diameter of 19.8 mm, an inside diameter of 5.0 mm and a weight of 0.061 g. This collector is called as "ABS collector 2" in short.

5) An ink tank: a polypropylene resin-made tube with an outside diameter from 7 mm (a point side) to 10 mm (an outlet) and an inside diameter from 2 mm (a point side) to 8 mm (an outlet) and its length about 8 mm.

6) A pen core 1: This is made of PET resin. It's length is 37.0 mm, the outside diameter, 1.8 mm and the weight, 0.188 g. It is made by fusing a bundle of PET fibers.

7) A pen core 2: A slim pen core; whose commercial name is "Procky slim core". It is made of PET resin. It's length is 27.0 mm, the outside diameter, 2 mm and the weight, 0.0638 g. It is produced by a fusion bonding of a bundle of PET fibers.
8) An ink-guiding core: This is made of PET resin. It's length is 22.5 mm, the outside diameter, 1.8 mm and the weight, 0.050 g. It is made by a fusion bonding of a bundle of PET fibers.
9) A brush head of a brush pen 1: this is made of polybutylene terephthalate (PBT) resin. It's length is 150 mm, an outside diameter of a bonded portion, 2.0 mm and the weight, 0.302 g. The brush head is a part for writing of a brush pen and it is used for writing as retaining ink or sumi-ink in it. Besides, the brush head is used for brush pen for a makeup. As the brush is made with fine filament fibers of a synthetic polymer, each fiber surface cannot give a wettability but it can absorb water, water-soluble ink, or cosmetic chemicals because of a capillarity.
10) A brush head of a brush pen 2: this is made of nylon 66 resin. Its length is 250 mm, an outside diameter of a bonded portion, 5 mm and the weight, 0.198 g.
11) Stuffing fiber: it has a structure that PET fibers (a diameter, 2 denier) are stuffed in a tube made of PP film. Its length is 78.0 mm and an outside diameter, 7 mm.
12) An ink-storing sponge: polyurethane-made sponge. The weight is 16.0 mg and the thickness 2.0 mm. The form is a trapezoid (an upper side 120 mm, an under side 170 mm and a height 19 mm) which is cut in a special form.

(B) Reagents (1) Polyvinylalcohol (PVA): its number-average degree of polymeriztion is 1500-1800.

(2) Sodium carboxymethyl cellulose (CMC)

(3) Acrylic acid (4) Methacrylic acid (5) Methyl methacrylate (6) Sodium persulfate (SPS)

(7) Potassium persulfate (KPS)

(8) N,N'-Azobisisobutylonitrile (AIBN)

(9) Cerium ammonium nitrate (IV) (CAN)

(10) Benzophenone

(11) Methanol

(12) Sodium hydroxide

(13) Hydrochloric acid

(14) Toluene (Impregnant A)

(15) Sodium dodecylbenzene sulfonate (DBS): this was used as a surfactant.

(16) Decahydro naphthalene (a mixture of cis- and trans-isomers) (Impregnant B)

(17) ortho-Hydroxy biphenyl (OHB): o-Hydrobiphenyl (1 g) and sodium hydroxide (0.2 g), a surfactant (sodium dodecylbenzene sulfonate) were dissolved in water of 200 ml. This solution is called as Impregnant C. Besides, a solution of o-hydroxy biphenyl (0.5 g) in methanol (300 ml) was dispersed in water and used as a carrier (the dispersion is Impregnant D).

(18) Sodium salicylate (SS): sodium salicylate (1 g) was dissolved in water (100 ml) and 0.5 ml of an aqueous hydrochloric acid solution (concentration, 10%) was added in it. The obtained solution was dispersed in water (the dispersin is Impregnant E).

(19) Diphenyl (DP): Diphenyl (2.5 g) and a surfactant (sodium dodecylbenzene sulfonate, 0.2 g) were mixed in water of 200 ml (the solution is Impregnant F).

(20) Carriant (a commercial product made by Toho chemical co. Ltd.): A carrier for the dyeing of polyesters or the other synthetic fibers. It contains anionic surfactants of aromatic ethers or similar compounds. It was used as a dispersion in water (Carrier 1).

(21) Carrier TW200 (a commercial product made by Nikka chemical co. Ltd.): a carrier for the dyeing of mixed fabrics containing polyesters and wool. It contains methyl-naphthalene and the other compounds. It was used as a dispersion in water (Carrier 2).

(22) An acid dye, Orange G (Color Index name: C. I. Acid Orange 10).

(C) Ozone Treatment: a specimen was put in a hard glass vessel of 2 L or 10 L volume (with an inlet and an outlet for gas), which was equipped with an ozone generator (a product of Mitsubishi Denki Co., Ltd., OS-IN). Then, ozone was generated by the ozone generator with an ozone yield of 1 g/hour or an oxygen gas containing an ozone with a concentration of 20 $g/m^3$, were introduced into the reaction vessel with a flow rate of 800 ml/min for 1-120 minutes. Then, an ozone-free oxygen was introduced into the reaction vessel for 10 minutes. The concentration of ozone was checked by an iodine titration. The extent of oxidation of a material was checked by an infrared spectroscopy using a specimen which was scrapped from the surface of the treated material. The change in the absorbance around 1710 $cm^{-1}$ (due to the absorption by carbonyl groups) or the ratio of it to the absorbance around at 973 $cm^{-1}$ were used for the judgement. The amount of ozone was 1 g/hour in example if no remarks was given.

(D) Plasma Treatment: a specimen (fabrics, films, and so forth.) was placed on a position between two electrodes in a reaction bath of a plasma generator (a Yamato PR 500). After the pressure of the reaction bath was decreased to 0.27 Pa, a mixture of argon and oxygen (a volume ratio, 1:1) was introduced in the reaction bath until the pressure was increased to 5.6 Pa. A power supply was from 40 W to 100 W, and a glow discharge was carried out mainly for from 30 seconds to 3 minutes at an oscillation frequency of 13.56 MHz. After the discharge, the introduction of a mixture of argon and nitrogen was stopped, the pressure was raised to a normal pressure and the treated specimen was taken out. The effect of the treatment was judged from a lowering of a contact angle of water to films.

(E) UV irradiation: In order to carry out an active treatment sterp, a high pressure mercury lamp (an H400P produced by Toshiba Co., Ltd.) was irradiated directly to a material from a distance of 10 cm. In order to carry out a grafting, a reaction mixture was put in a Pylex-glass-made reaction vessel, and a high pressure mercury lamp (an H400P produced by Toshiba Co., Ltd.) was irradiated to the reaction vessel from a distance of 20 cm. In order to obtain a uniform irradiation, the reaction tube rotated itself and is revolved around the UV lamp. The reaction mixture means a solution of an initiator and a monomer in a solvent, or a gas such as air or nitrogen containing monomer vapor.

(F) Evaluation of water absorptivity: measurements of a water absorptivity and a rate of water-absorption as described below.

(1) Water absorptivity: a specimen (size 10 cm×10 cm) was put in a beaker containing water, and it was stirred mildly with a glass rod for one minute. Then, the specimen was taken out of the beaker and hung down for 3 minutes (until water drops were not found). The increase in weight of the specimen (an amount of absorbed water) was estimated by the subtraction of the weight of the dried specimen from the weight of the water absorbed specimen. The percentage of a weight of absorbed water to the dried weight of the specimen gives "water absorptivity".

Water absorption (%)=(a weight of absorbed water/a weight of dried specimen)×100.

(2) Water absorption rate: a specimen of 1.5 cm width was hung and the portion of 1.5 cm length from the edge was immersed in water. The distance of water risied for one minute was observed (unit, cm/min.).

(G) Measurement of contact angle of water: a contact angle measuring apparatus (the CA-X of Kyowa Kaimen Kagaku Co., Ltd.) was employed. A water drop of about 1 mm diameter was dropped on a surface of a specimen by an injector at 20° C., and the contact angle was estimated by a calculation from the figure of the water drop enlarged by a video camera.

(H) Washing fastness test: a specimen was put in an aqueous solution (0.4 wt. %) of a weak-alkaline, fatty acid soap (a commercial name, Powder Soap of Lion Co., Ltd.) with a liquor ratio of 1/250 and it was washed in the boiling state for 5 minutes with stirring. Then, the specimen was completely rinsed with water and dried. A water absorption (%), a water absorption rate and a tensile strength were measured and the values were compared with those before this washing process.

(I) Evaluation of dyeing property : ten orthodontic brackets were put in an aqueous solution of an acid dye, Orange G (100 ml), and an acetic acid was added in the mixture to give the pH=5.0. The dyeing mixture was boiled for 15 minutes, then the boiling was stopped and it was allowed to stand for 2 hours. The orthodontic brackets were washed in a boiling water and dried.

(J) Tensile strength test: a specimen was cut in a rectangle (the size, 15 mm×70 mm), and it was equipped on a tensile strength tester (a SFV-55-0-20M of Imada Seisakusyo Co., Ltd.) in the way that each part of 1 cm width from both edges of the specimen is pinched by the cramps of a tensile tester (a SFV-55-0-20M of Imada Seisakusyo Co., Ltd.) and it was drawn at a rate of 100 mm/min. Each specimen was drawn along its lengthwise direction or its cross direction. Only the values along the lengthwise direction are given in each of specimens.

(K) Peel strength test of adhesion (1) film: a test piece was cut in a rectangle with a size of 30 mm (vertical direction)×5 mm (a width). An adhesive 0.1 g is put on the part of 5 mm width from the edge of the test piece and the test piece was attached to a plywood board (2 mm in thickness, size 20 mm×10 mm) or a tag paper (0.2 mm in thickness, size 20 mm×10 mm). A weight of 500 g was put on the test piece attached to the plywood board or the tag paper covered with polyethylene film for 12 hours. Both of a portion of 10 mm which was not attached to the plywood and that of the another end which was not pasted to the film were pinched by the cramps of the tensile tester (a AGS-H of Shimadzu Seisakusyo Co., Ltd.) and it was drawn by the tester at a rate of 30 mm/minute. The energy required for the peeling of the test piece was estimated from the tester. In order to standardize adhesion conditions, the relative value was calculated by setting the measured value for the untreated test piece as 1.0 by the similar measurement.

Used adhesives were a polycyanoacrylate type adhesive (Aron-alpha, a product of Toa Gosei Co., Ltd.) for an adhesion to the plywood board and a stick-type paper use adhesive for stationery (a commercial name: UHF stick produced by Mitsubishi Pencil Co. Ltd.) for an adhesion to the tag paper.

(2) Orthodontic brackets: about 0.1 g of an adhesive was put on the surface of treated or untreated brackets. Then, the bracket was attached to an upper surface of a ceramic plate (size 10 mm×20 mm). A metallic loop wire was connected to the bracket by hanging. The ceramic plate was pinched by an under cramp of a tensile tester (a SV-55-0-20M of Imada Seisakusyo Co., Ltd.) and the metallic loop wire was pinched by an upper cramp. The specimen mounted on the tensile tester was drawn at a rate of 110 mm/min and the stress which was necessary for the peeling the adhesion between the bracket and the ceramic plate was observed. In order to standardize the measured tensile strength, the observed value for the untreated bracket in the similar measurement was defmed to be 1.0 and the peel strength of adhesion was estimated as a relative value. An adhesive containing polymeric methacrylic resin, and so forth which is used by mixing methyl methacrylate monomer, poly (methyl methacrylate) and catalysts (a commercial name, Super Bond (San Medical Co. Ltd.) or a homemade polymer solution were used as adhesives.

(3) Ink-absorbing sponge: each part of 5 mm width from the edge of an ink-retaining sponge are pinched by the cramps of a tensile tester (a AGS-H of Shimadzu Seisakusyo Co., Ltd.) and it was drawn at a rate of 100 mm/min.

(L) Retention of electrolytic solutions: a weight of a dried test piece (size 5 cm×5 cm) was defined as W1. A specimen was dipped into an aqueous potassium hydroxide solution (30 wt. %) for 5 minutes. The specimen was taken out of the solution and was hung on for 3 minutes. The weight of the specimen W2 was measured when liquid drops were not seen. The following equation gives the absorption (%) of an electrolytic solution.

$$\text{Electrolytic solution retention (\%)}=100\times(W2-W1)/W1$$

(M) Alkali-resistance of battery separators: a weight of a dried specimen (size 5 cm×5 cm) was given as W1. A specimen was dipped in an aqueous potassium hydroxide solution (30 wt. %) for two weeks at 70° C. The specimen was taken out of the solution and its weight (W2) was measured after hanging for 3 minutes. Then the specimen was washed with water sufficiently and dried in vacuum, and the weight (W3) was measured. An electrolytic solution (%) and a weight increase (%) were obtained by the following equations.

$$\text{Electrolytic solution absorption (\%)}=100\times(W2-W1)/W1$$

$$\text{Weight decrease (\%)}=100\times(W1-W3)/W1$$

(N) Acid-Resistance of Battery Separators: a weight of a dried specimen (size 5 cm×5 cm) was given as W1. A specimen was dipped in an aqueous sulfuric acid solution (40 wt. %) for two weeks at 70° C. After two weeks, the specimen was taken out of the solution and was hung on for 3 minutes. The weight of the specimen (W2) was observed. Then, the specimen was washed in water and dried sufficiently, and its weight W3 was measured. In addition, its water absorptivity and tensile strength were observed. The following equations were used to estimate an absorption (%) of an acid electrolytic solution and a weight decrease (%).

$$\text{Electrolytic solution absorption (\%)}=100\times(W2-W1)/W1$$

$$\text{Weight decrease (\%)}=100\times(W1-W3)/W1$$

(O) Oxidant-resistance test of battery separators: non-woven fabrics treated for battery separators were dipped in an aqueous solution of hydrogen peroxide (concentration, 40 wt. %) for seven days at 50° C., Then, the specimens were washed sufficiently in water and dried, and the weight change and tensile strength were measured.

The battery performance test was carried out by the following methods, (P)-(T).

(P) Lowing of capacity of batteries incorporated with battery separators in the course of the self discharge: a treated specimen was incorporated in a sealed nickel-hydrogen battery of a coin-size (a nominal capacity, 500 mAh). When the property of the battery seemed to be stable, they were charged to 120% of the capacity by an electric source of 0.1 C(Coulomb). After four cycles of charge-discharge processes, the percentage of an average value of a residual capacity (C) to the original value for each of batteries was estimated after the test for two weeks at 45° C.

(Q) Charge/discharge method for batteries incorporated with battery separators: the charge was carried out by charging direct current of 100 V into a sealed-type lead storage battery (with six cells) until the voltage of the battery became 12 V. The discharge was carried out by connecting the electric terminals to both poles of the battery, and added a resistance to make the electric current to be 1.20 A or 34 A.

(R) Change in capacity of a battery incorporated with a battery separator by the discharge for 5 hours: the time when the terminal voltage of all cells in the battery changed from 12 V to 10.5 V (1.7V/cell) from the beginning of the discharge (an initial current of 1.20 A) was observed.

(S) Change in capacity of batteries after discharge at low temperature: The time (electric discharge persistence time) when the terminal voltage of all cells in the battery changed from 12 V to 6 V (1.0 V/cell) by the discharge from the beginning of the discharge (an initial current of 35 A) was observed at −15° C.

(T) Voltage of a battery incorporated with a battery Separator after a discharge for five seconds: the terminal voltage per one cell in the battery was observed at 5 seconds after beginning the effective discharge at low temperature.

Example 1

Hydrophilic Treatment of Polypropylene Non-woven Fabric by Modification 1 A PP non-woven fabric 1 (weight 1.0 g, size 20 cm×20 cm) which was given as Sample 1 in Table 1 was immersed in 100 ml of Impregnant A (tolune) for 10 minutes at 50° C. in order to carry out the impregnation step. Then, the PP fabric was rinsed with methanol and centrifuged for one minute at a rate of 800 rpm. The increase in weight of the PP fabric was about 4 wt. %. Then, the PP fabric was treated with ozone for 30 minutes in order to carry out the activation process. An IR spectroscopy of the treated or untreated PP fabrics was carried out and the ratio of the absorbance at around 1710 $cm^{-1}$ (which is due to the absorption of carbonyl groups) for the treated PP fabric to that of untreated PP fabric was 0.02. Then, the treated PP fabric was put in a vessel containing 200 ml of water, 1 g of PVA, 20 mg of cerium ammonium nitrate (IV) and 0.6 ml of acrylic acid, and the UV irradiation was made to the reaction vessel from the distance of 20 cm for 120 minutes at 30° C. After the treatment, the treated PP fabric was washed with a boiling aqueous solution of detergent for 10 minutes and washed with water and dried. The water absorption of the obtained specimen was 310% according to the water absorption test. The rate of water-absorption was 2.0 cm/min. As the treated PP fabric gave excellent properties in a water absorption, a retention of electrolytic solutions, a high alkali-resistance, a high acid-resistance and a high oxidant-resistance, the present modification method is very effective for the preparation of battery separators.

Example 2

The same procedure as described in Example 1 was followed, except that Impregnant B was used as an impregnant, except that a plasma treatment for 30 seconds was carried out as an activation process and except that methacrylic acid was used as a monomer.

Example 3

The same procedure as described in Example 1 was followed, except that Impregnant F was used as an impregnant, and except that a UV irradiation for 60 minutes was carried out as an activation process.

Comparative Examples 1-5

Comparative Example 1 gave the result with untreated specimens of the PP non-woven fabrics 1 used in Example 1. Comparative Examples 2-5 were carried out by the same procedure as Example 1, except that one or two processes in Example 1 were omitted.

Example 4

The same procedure as described in Example 1 was followed, except that Impregnant C was used as an impregnant, and except that a plasma treatment for 30 minutes was carried out as an activation process.

Comparative Example 6

It gives the result with untreated PP plain fabric.

Comparative Example 7

The same procedure as described in Example 4 was followed, except that the impregnation treatment was omitted, and except that 10 mg of AIBN was used as an initiator of grafting instead of CAN.

Example 5

The same procedure as described in Example 1 was followed, except that a PET non-woven fabric of Sample 4 (a size, 10 cm×10 cm) was used, except that an aqueous dispersion of Carrier 2 (5 g of the reagent was mixed with 200 ml of water) was used for the impregnation process, except that an ozone treatment was carried out as the activation process and except that a thermal grafting was carried out at 80° C. using 10 mg of AIBN as an initiator instead of CAN.

Example 6

Grafting in the Gas Phase

An impregnation process of a PET non-woven fabric of Sample 4 (a size, 10 cm×10 cm) was carried out in Impregnant A for 5 minutes at 30° C. As the activation process, an ozone treatment for 20 minutes was attained. The monomer grafting was carried out as follows; the PET non-woven fabric treated by the impregnant and activation processes was put in a glass-made reaction vessel. The vessel was evacuated and 0.2 ml of MMA was put into it. After vaporizing the MMA in the vessel by an evacuation to some extent, a UV irradiation to the reaction vessel was carried out for 90 minutes. The treated PET non-woven fabric gave a monomer grafting of 5%. It gave good improvements in the adhesion property and the dyeing property.

Comparative Examples 8-12

Comparative examples 9-12 were carried out by the same procedure as described in Example 1, except that one or two processes were omitted.

Example 7

A PP/PET non-woven fabric of Sample 3 in Table 1 was used as a specimen. Impregnant C was used for the impregnation step and a plasma treatment for 30 minutes was carried out as an activation process. A thermal monomer grafting was carried out for two hours at 80° C. using a monomer, methyl methacrylate and an initiator, KPS.

Example 8

The same procedure as described in Example 7 was followed, except that a PP/PET non-woven fabric was used as a specimen, and except that Impregnant E was used for the impregnation step and except that an initiator, KPS and a monomer, acrylic acid were used.

Comparative Example 13

It gives the result with an untreated PP/PET non-woven fabric.

Example 9

A PET film of Sample 12 was used. The PET film (weight 1.62 g, size 15 cm×15 cm) was immersed in 100 ml of an Impregnant E for 15 minutes at 70° C. as an impregnation step. Then, the PET film was rinsed with methanol and the waste of the impregnant was wiped off with a paper and dried for 5 minutes at room temperature. Then, the PET film was treated by an ozone treatment as an activation process. Subsequently, the treated PET film was put in a Pyrex glass-made reaction vessel containing a solution of 1.2 ml of acrylic acid in 200 ml of water and an UV irradiation to the reaction vessel was carried out for 2 hours at 30° C. After the process, the PET film was washed with an aqueous solution of a detergent for one minute at 60.° C., washed for one minute with a boiling water, washed with water and dried. The water absorption of the obtained specimen was 90% and its contact angle of water was 63.degree. Its peel strength of the adhesion to a label paper bound with a stick-type paper use adhesive for stationery was 4 when that for an untreated PET film was 1.

Comparative Examples 14-18

They give the results with untreated PET films and the results obtained by the same procedure described in Example 9, except that one or two processes were omitted.

Example 10

A HMPE plate of Sample 13 (a weight, 3.84 g and a size, 10 cm×10 cm) was immersed in 100 ml of Impregnant B for 15 minutes at 70.° C. as the impregnation step. Then, the specimen was rinsed with methanol and the waste of the impregnant was wiped off with a paper and dried for 5 minutes at room temperature. Then, the specimen was made by an ozone treatment for 30 minutes as the activation step. Subsequently, the monomer grafting by the UV irradiation similar to Example 1 was carried out using 180 ml of water, 20 mg of CAN and 1.0 ml of acrylic acid.

Comparative Examples 19

It gives the result with an untreated HMPE plate of Sample 13.

Comparative Examples 20-23

They give the results obtained by the same procedure described in Example 10, except that one or two steps were omitted.

Example 11

A PP film of Sample 11 (a weight, 0.38 g and a size, 15 cm×15 cm) was immersed in Impregnant C (100 ml) for 10 minutes at 70.° C. as an impregnation process. Then, the specimen was rinsed with methanol and the waste of the impregnant was wiped off with a paper and dried for 5 minutes at room temperature. Then, the specimen was made by an plasma treatment for 30 seconds at 30° C. as the activation step. Subsequently, the monomer grafting by the UV irradiation similar to Example 1 was carried out using 180 ml of water, 20 mg of AIBN and 1.0 ml of acrylic acid.

Comparative Example 24

It gives the result with untreated PP films.

Comparative Examples 25-28

The same procedure described in Example 11 was followed, except that one or two processes were omitted.

The above results are summarized in Table 2. In Table 2, the water absorption 1 gives the water absorption % of the specimen after the processes which were washed with an aqueous detergent solution and water at room temperature and dried, the water absorption 3 gives the water absorption % of the specimen after the treatment steps which were processed by the three times of washing with a boiling aqueous detergent solution and water and a drying. In Table 2, ozone, plasma and ultra-violet light are represented by OZ, PL and UV, respectively. In the results in Examples 9-11 and Comparative Examples 14-18, the adhesive used for the measurement of the peel strength of the adhesion is an adhesive containing mainly polycyanoacrylate for Example 10 and Comparative Examples 19-23, and a stick-type paper use adhesive for stationery was used for the other Examples and Comparative Examples.

Example 12

A Method to Give Hydrophilic Property to Carbon Fiber and its Use for Composite

Carbon fiber (6.0 g) of Sample 9 in Table 1 was used as a specimen. The specimen was immersed in methanol for 30 minutes at 50° C. as the impregnation process. Then, the treated specimen was centrifuged for one minute at a rate of 800 rpm. Then, the specimen was put in a hard glass vessel with 1.5 mm thick. The ozone was regenerated as follows; oxygen was introduced into an ozone-regenerator with a flow rate of 100 ml/min and ozone with a concentration of 40 mg/L was regenerated. The ozone was introduced in the reaction vessel for 30 minutes at 20° C., and subsequently, ozone-free oxygen was introduced in the vessel for 10 min. Then as the monomer grafting step, the treated specimen was put in a glass-made reaction vessel and acrylic acid 1.2 ml, water 200 ml and methanol 5 ml were added in it. The same UV irradiation to the reaction vessel as described in Example 1 was carried out for three hours as the grafting step. Then, the reaction mixture was put in a large amount of water. The carbon fiber attached by polymers was taken out of the water. The treated carbon fiber was washed in a boiling aqueous detergent solution, three times. The grafting was 15%. After drying, the carbon fiber gave the water absorption 200% (that of untreated carbon fiber, 60%).

Comparative Example 29

The same procedure as described in Example 12 was followed, except that the impregnation process was omitted. The grafting % of the treated specimen was 4.2% and its water absorption was 130%.

Comparative Example 30

The same procedure as described in Example 12 was followed, except that the activation process was omitted. The grafting % of the treated specimen was 3.0% and its water absorption was 110%

Comparative Example 31

The same procedure as described in Example 12 was followed, except only the UV irradiation grafting was carried out and the other steps were omitted. The grafting % of the treated specimen was 1.0% and its water absorption was 100%.

Example 13

The carbon fiber processed in Example 12 was mixed with an epoxy resin adhesive and a rod of 5 mm width×5 mm thickness×100 mm length was prepared by drying the mixture. As a reference, a rod with similar size to the above one was made with the epoxy resin adhesive and untreated carbon fiber. The tensile strength of the epoxy resin rod reinforced by the hydrophilic carbon fiber was 40 times larger than that of the reference rod containing untreated carbon fiber.

Example 14

Hydrophilic Treatment of Wool Fiber Fabric

Wool fiber (1.0 g) of Sample 10 in Table 1 was used as a specimen. The specimen was immersed in a solution of anhydrous sodium carbonate (10 mg) in methanol (10 ml) and water (90 ml) for 30 minutes at 50° C. as the impregnation step. Then, the treated specimen was centrifuged for one minute at a rate of 800 rpm. Then, the specimen was treated by an ozone treatment similarly to Example 12. Then as the grafting step, the treated specimen was put in a glass-made reaction vessel and acrylic acid 1.2 ml, water 200 ml and methanol 5 ml were added in it. The UV irradiation was carried out to the reaction vessel for two hours similarly to Example 12 under an air atmosphere. The wool fiber fabric attached with polymers was take out of the reaction vessel. The treated specimen was washed in a boiling aqueous solution of a detergent three times. The grafting was 18%. The obtained treated wool fiber fabric gave a water absorption 300%.

Comparative Example 37

The same procedure as described in Example 14 was followed, except that the impregnation process was omitted. The grafting percentage of the treated specimen was 4.2%.

Comparative Example 38

The same procedure as described in Example 14 was followed by carrying out only the monomer grafting step by the UV irradiation, except that the other processes were omitted. The grafting percentage of the treated specimen was 1.5%.

Comparative Example 39

The same procedure as described in Example 14 was followed, except that the activation process was omitted. The grafting percentage of the treated specimen was 1.6%.

Example 15

Water Absorption Test

Treated or untreated wool fiber fabrics were floated on the surface of water, keeping the thin direction of the specimen parallel to the surface. The time for the specimen absorbed water to sink was observed. The short time indicates a high hydrophilic property. The time observed for an untreated wool fiber fabric was 60 minutes. The time observed for the wool fiber fabric treated in Example 14 was one second and those observed for the wool fiber fabrics obtained by Comparative Examples 37, 38 and 39 were 15 seconds, 28 seconds and 30 seconds, respectively.

Example 16

Improvement of the Hydrophilic Property of Polypropylene-Made Synthetic Papres

The same procedure as described in Example 2 was followed to treat porous PP films of Sample 14 in Table 1 which were used as synthetic papers, and their hydrophilic property was improved. It was possible to write characters with water-soluble ink on the treated synthetic papers. In addition, it was possible to bond label papers to the treated synthetic papers with water soluble glues (starch, CMC, PVA glues, and so forth.). As the label paper bond to the treated synthetic paper was broken in the tensile strength measurement, its peeling was impossible.

Example 17

Improvement of the Hydrophilic Property of Porous Polyethylene Film and its Application for Filters.

The same procedure as described in Example 9 was followed, except that porous polyethylene film of Sample 15 in Table 1 was used as the specimen. The water absorption of the treated PE film was 200% (that for an untreated specimen was 5%). The contact angle of water to the treated specimen could not be observed (it seemed to be 0.degree.

that of the untreated specimen 120.degree.) Furthermore, the weight increase in the treated specimen was 2%. The obtained hydrophilic porous polyethylene film gave the alkali-resistance and the acid-resistance, and it was useful for the filtration of components contained in water.

Example 18

Improvement of the Hydrophilic Property of Porous Polysulfone Film and its Application for Filters.

The porous polysulfone film of Sample 16 in Table 1 (weight 0.5 g, size 10 cm×10 cm) was immersed in an aqueous methanol solution (methanol 10 volume %) for one minute at room temperature as the impregnation step. Then, the specimen was treated with ozone for two minutes as the activation step. The other procedures were carried out in the same manner as described in Example 17.

The water absorption 3 of the treated polysulfone film was 250% (that for a untreated specimen was 5%). The contact angle of water to the treated film could not be observed because of the high water absorption property (that of the untreated specimen 120.degree.). Furthermore, the weight increase in the treated specimen was 2%. The obtained hydrophilic porous polysulfone film gave the alkali-resistance and the acid-resistance, and a high heat-resistance (it was thermally treated three times in an autoclave at 120° C.). The obtained treated porous polysulfone film useful for the filtration of components contained in water.

Example 19

Improvement of Hydrophilic Property of PP Non-woven Fabric 2 by "Modification Method 2".

A PP non-woven fabric 2 (weight 1.0 g and size 15 cm×15 cm) which is given as Sample2 in Table 1 was immersed in 100 ml of Impregnant F for 5 minutes at 50° C. Then, the fabric was centrifuged at a rate of 1000 rpm. When the increase in weight of the PP fabric was 4 wt. %, it was treated with ozone for 30 minutes at 20° C. in order to carry out the activation process. Then, the treated specimen was put in a reaction vessel. Furthermore, after 20 ml of water, 60 mg of potassium persulfate, 0.3 g of polyvinyl alcohol and 6 ml of methanol were added in the reaction vessel, the reaction mixture in the vessel was allowed to stand for two hours at 80° C. Then, the specimen was washed with water and washed with an aqueous solution of a detergent. The water absorption 3 of the obtained treated PP non-woven fabric 2 was between 800% and 1000%. The weight increase in the specimen after the hydrophilic treatment was not measured within the accuracy of 0.1 mg. The result is given in Table 2. After six times of washings with a detergent, the obtained specimen kept a water absorption of over 810%. The obtained treated specimen was completely applicable for the material which could be used as materials with the water absorptivity.

Example 20

Improvement of Hydrophilic Property of PP Non-woven Fabric 2 by "Modification Method 2".

The same procedure as Example 19 was followed, except that CMC was used for the hydrophilic polymer treatment instead of PVA. The water absorption percentage of the treated specimen was 600-900% and the water absorption property gave a durability.

Example 21

Application as a Microbial Culture Medium

Each of improved non-woven fabrics obtained by the same procedure as Examples 19 and 20 was cut in two pieces of a size of 2 cm×2 cm, and they were aligned in a petri dish of 8 cm diameter and 2 cm depth without an overlapping. A bouillon/agar solution 100 ml was prepared by dissolving meat extract (191 wt. %), polypeptone (1 wt. %), sodium chloride (0.5 wt. %) and agar (0.5 wt. %) in water. The agar in the mixture was dissolved by using a microwave oven, and a bouillon/agar solution 50 ml was infiltrated through said non-woven fabrics prepared by the present method. Then, the mixture was cooled down to the room temperature. The non-woven fabrics containing the bouillon/agar solution were put in the test tubes, which had been autoclaved for 15 minutes at 120° C. These test tubes were allowed to stand at 37° C. overnight. The following day, after confirming the asepsis,. microbes (*Escherichia coli* K-12 strain, *Salmonella Typhirnurium* LT-2 strain and *Bacillus subtilis Marburg strain*, and so forth.) were planted on the fabrics, and they were cultivated overnight at 30-37° C. A microscopic observation showed that each of the microbes was growing well.

Comparative Example 40

The same procedure as described in Example 19 was followed, except that the impregnation process was omitted. The water absorption percentage of 780% of the treated specimen decreased to 400% after three times of washings with an aqueous detergent solution.

Example 22

Improvement of Hydrophilic Property of Sample 6 by "Modification Method 3" and its Application for Cleansing/Wiping Cloth A polypropylene/polyester sheath-core type conjugated fiber, PP/PE non-woven fabric (2.4 g) which is given as Sample 6 in Table 1 was immersed in 10 ml of Impregnant D for 10 minutes at 30° C. as the impregnation step. Then, the fabric was centrifuged (a rotation rate, 1000 rpm) until the extent that the surface looked dry apparently. The weight increase in the specimen after the step was about 4%. Then, the specimen was treated with ozone for 30 minutes. Then, the ozone-treated specimen was put in an Erlenmeyer flask, and 5 ml of methanol, 100 ml of water, PVA (0.5 g) and potassium persulfate (0.1 g) were added in the flask and the flask was allowed to stand for 2 hours at 80° C. After this treatment, the specimen was washed sufficiently with water at 60° C. Then, after squeezing water, the treated no-woven fabric was put in a vessel together with water (400 ml), CAN (10 mg) and acrylic acid (5 ml). The reaction mixture was allowed to stand for 2 hours at 80° C. under air atmosphere. After the treatment, the treated fabric was washed with an aqueous solution of a detergent at 60° C., three times (500 ml of water was used in each washing). After drying the treated specimen, it gave a water absorption of 2310%. That of an untreated non-woven fabric was 350%. The weight increase in the specimen by the hydrophilic treatment was 4%. The present modification method gave higher water absorption (%) and faster water-absorption rate and more durable water absorption property than the procedure by "Modification 1" (Modification method 1 gave about 1400% for the same specimen as used here), and the treated specimen was useful for the cleansing/wiper application. After absorbing water to the treated non-woven fabrics (water absorption, about 2000%), ten pieces of the treated non-woven fabrics were superposed. The superposed non-woven fabrics were mounted on a cleansing mop and the mop was used to clean a wooden floor. After using it, it was rinsed with water and used repeatedly. It could be used over ten times.

Example 23

Hydrophilic Treatment of PP Non-woven Fabric 2 and an Application for Disposable Sanitary Supplies.

A model of disposable diaper was prepared as follows: the hydrophilic polyolefin non-woven fabric obtained by the procedure of Example 19 was used for an inside cloth, an untreated hydrophobic polyolefin non-woven fabric was used for the outside cloth, and a water retention agent (water-absorption polymers; pulp, starch or polyacrylic acid and its derivatives, and so forth.) was used as a core material. Namely, an untreated hydrophobic polypropylene non-woven fabric was put on the bottom, and a water retention polymer was put on it, and the hydrophilic polyolefin non-woven fabric 2 of the present invention was put on the top. When water was poured on the diaper model, water was penetrated quickly through the hydrophilic polyolefin non-woven fabric 2 and absorbed by the water retention agent. Thus, the non-woven fabric improved in the water absorption property prepared by the present invention was available preferably for the material for disposable diapers and sanitary materials or sanitary protections.

Example 24

Improvement of Adhesion Property of a Dentition Orthodontic Appliance

MMA was grafted to 20 pieces of polypropylene-made orthodontic brackets (0.622 g) by the same procedure as described in Example 6. Polymerization inhibitors contained in MMA were removed before use. The treated brackets gave a good adhesion property in the adhesion to ceramic materials for the dentition with a polymerizable acrylic resin adhesive, and the breakdown of the bracket bonded to the ceramics was observed in the peel strength test. In addition, the orthodontic brackets made of nylon 12 and the other polymers gave the same results as those described above. After dipping the modified brackets which were bonded to the ceramic materials in water for one year at 30° C., the loweing in the adhesion force between them was not observed. Both brackets of PP and nylon 12 which were modified by the present invention were not dyed with an acid dye (Orange G) in the dyeing test.

Comparative Example 41

PP/PE non-woven fabrics modified by the hydrophilic treatment with well-known surfactants (the non-woven fabrics produced by Japan Vilene co. Ltd. were impregnated with surfactants) were prepared and the same tests as Example 1 were carried out. The results are given below.
1) Alkali-resistance test: the water absorption property of the treated fabric decreased to the original value of the untreated fabric, 5%.
2) Acid-resistance test: after washing sufficiently with water, the water absorption property of the treated fabric decreased to the original value f of the untreated fabric, 5%.
3) Oxidant-resistance test: after washing sufficiently with water and drying, the water absorption property of the treated fabric decreased to the original value of the untreated fabric, 5%.

Comparative Example 42

Grafting of Acrylic Acid to PP Non-woven Fabric 1 by a Well-known UV Irradiation.

PP non-woven fabric1 (weight 1.2 g and size 7.7 cm×10 cm) was put in a reaction mixture containing acrylic acid monomer 20.0%, water 78.8%, benzophenone 0.2% and methanol 1.0% (each % represents weight %), and the reaction mixture was made by the UV irradiation for two hours. After the reaction, the product was jelled with resulted polymers, but when the product was washed with a boiling aqueous solution of a soap, a sodium salt of a fatty acid for 10 minutes and water, the specimen was separated from the polymers dissolved in the washing process. The water absorption percentage of the treated non-woven fabric was 100% (that of the untreated non-woven fabric was 48%). Its grafting percentage was 1%. Namely, the grafting by the UV irradiation to the present non-woven fabric seemed to be difficult, and the polymer composed of only acrylic acids which was formed seemed to be dissolved and removed from the fabric by washing with a boiling aqueous detergent solution. The water absorption of the treated no-woven fabric was decreased by the treatment with acids or alkalis.

Examples for writing materials are described below.

Writing Implement Example 1

Hydrophilic Treatment of PP Collector 1 by Modification 1.

The 40 pieces of PP collector 1 were immersed in 200 ml of Impregnant D for 5 minutes at 50° C. in order to carry out the impregnation step. Then, the collectors were rinsed with methanol and centrifuged for two minutes at a rate of 1000 rpm. The impregnant impregnated in the collectors was about 2% in weight. Then, the PP fabric was treated with ozone for 30 minutes as the activation process. The IR spectroscopy of the surface of the treated collectors was carried out and the ratio of the absorbance at around 1710 $cm^{-1}$ (which is due to the absorption by carbonyl groups) to that at around 973 $cm^{-1}$ was 0.02. Then, the treated collectors were put in a Pyrex-glass vessel containing 200 ml of water, 10 ml of acrylic acid and 100 mg of potassium persulfate. After putting a cover on the vessel, The UV irradiation was made to the reaction vessel for two hours. The treated collectors were taken out of the reaction mixture and was washed in a aqueous solution of a detergent for 10 minutes at 60° C. and washed with water and dried. The collectors improved in the hydrophilic property were obtained. The obtained improved collectors were reversed. The portion of a distance of 3 mm from the end of the collector was immersed in water or an aqueous water-soluble ink solution. The water or the ink solution went up to the top of the collector in 10-20 seconds, while untreated collectors gave no ascent of water or the ink solution in the same test as described above. The collectors obtained by the present process were easily wetted with water and their contact angle of water was below 5.degree. On the other hand, the untreated collectors were not wetted with water when they were immersed in water and their contact angle of water was about 100.degree.

Writing Implement Example 2

200 pieces of PP collector 2 were immersed in Impregnant B for 5 minutes at 50° C. After this process, the same procedure as described in Writing Implement Example 1 was followed, except that methacrylic acid was used as a monomer instead of acrylic acid. The obtained modified PP collectors 2 gave a good wettability to water and their contact angle of water was below 5.degree. They were wetted well with water-soluble inks and gave the property preferable for ink collectors. On the other hand, the untreated PP collector 2 was not wetted with water when they were immersed in water and their contact angle of water was about 100.degree.

Writing Implement Example 3

ABS collector 1 and ABS collector 2 were used. Their impregnation process was carried out using Impregnant A at 20° C. After this process, the same procedure as described in EXAMPLE 1 FOR WRITING MATERIALS 1 was followed. The grafting % of acrylic acid of the treated collectors was 0.1-0.2%. Their wettablity to water or water-soluble inks was completely improved. Their contact angle of water was below 5.degree. The contact angle of untreated collectors to water was about 80-90.degree.

Writing Implement Example 4

The performance test of the PP collectors 1 obtained by the method of Writing Implement Example 1 was carried out. A pen point 5 made of polyester was connected to the hydrophilic PP collector 1 and an ink tank chamber made of polypropylene was mounted on them. FIG. 1 gives the structure in which a PP collector 1, an ink tank chamber 2 and a pen core 3 were set up.

In the collector1, the slit width between the farthest tooth of the comb from the pen nib is located at L1=3.5 cm, the slit width between all teeth which are located over L2=2.7 cm is 0.15 mm, the slit width between all teeth located in the range of L2=2.7 cm and L3=2.2 cm is 0.22 mm and the slit width between all teeth located within L3=2.2 cm from the pen point is 0.25 mm. The portion between the collector 1 and the ink tank chamber 2 was comparted by a barrier material which has a lot of air-displacement voids whose size was smaller than any slits between the teeth of the comb structure. The pen core 3 which is penetrated to the collector dives further in the ink tank in a direct-liquid type pen. Then, the ink tank was filled with the ink 4 which contains water as a main solvent and has a surface tension and density adjusted to be about 40 mnN/m and 1.08 g/ml at 25° C., respectively. Thus, a direct-liquid type pen containing the ink 4 was prepared.

When the nib 5 of the pen prepared in this way was oriented downwardly, the outer pressure was gradually lowered and all of the slits in the teeth of the comb of the collector 4 were filled with the ink 4. In the process that all of the slits in the teeth of the comb of the collector 4 were filled with the ink 4, any leak of the ink from the pen nib was not observed. In addition, the ink 4 stored in all of the slits in the teeth of the comb of the collector 4 did not leak from the pen nib 5, keeping the state of the ink retaining. After that, in the course that the outer pressure was gradually increased, all of the ink 4 stored in the collector 1 returned to the ink tank 2. Thus, the ink collector worked well as a temporary ink retaining body. Similarly to the above manners, a hydrophilic ABS collector 1 which had been obtained in Writing Implement Example 3 was mounted between a polypropylene-made ink tank chamber and a pen nib. When the writing test was carried out, this ink collector worked well.

Writing Implement Example 5

Using the hydrophilic ink collector 1 which had been prepared by the same procedure as described in Writing Implement Example 1, an ink which contained ethyleneglycol monoether as a main solvent and has a surface tension and density adjusted to be about 38.5 mN/m and about 1.03 g/ml at 25° C., respectively was filled in the ink tank by the same manners as described in Writing Implement Example 4. Thus, a direct-liquid type writing pen filled with the ink was prepared.

The pen nib of the writing pen prepared in this way was oriented downwardly and the outer pressure was gradually lowered and all of the slits in the teeth of the comb of the collector were filled with the ink. In the process that all of the slits in the teeth of the comb of the collector were filled with the ink, any leak of the ink from the pen point was not observed. In addition, the ink saved in all of the slits in the teeth of the comb of the collector did not leak from the pen nib, keeping the state of the ink storing. After that, in the course that the outer pressure was gradually increased, all of the ink saved in the collector returned to the ink tank. Thus, the ink collector worked well as a temporary ink retaining body.

Writing Implement Example 6

A hydrophilic PP collector 2 obtained by the Modification 1 was mounted between a PP-made ink tank chamber and a PET-made pen nib. The mechanism was similar to FIG. 1, but the collector structure was made by a stack of disks. In this collector with sheet bodies, the farthest disk from the pen point is located at L1=3.0 cm, the slit width between the sheet bodies which are located at over L2=2.5 cm is 0.20 mm, and the slit width between the sheet bodies which are located within L3=2.5 cm from the pen nib is 0.25 mm. The portion between the sheet bodies and the ink tank chamber was comparted by a barrier material which has a lot of air-displacement voids whose size was smaller than any slits between the disks. The pen core which is penetrated to the collector dives further in the ink tank in a direct-liquid type pen Then, the ink tank was filled with the ink 4 which contains water as a main solvent and has a surface tension and density adjusted to be about 35 mN/m and about 1.08 g/ml at 25° C., respectively. Thus, a direct-liquid type pen containing the ink was prepared. The direct-liquid type writing pen prepared in this way gave no leak of ink when the outer pressure was changed in the writing test and the ink collector worked well.

Writing Materials Example 7

An ABS collector made by sheet bodies obtained by the treatment of Example 2 was mounted between a PP-made ink tank chamber and a PET-made pen point. In this collector, the farthest disk from the pen point is located at L1=5.0 cm, and the distance of slits between all sheet bodies located in the range L2=4.0 cm is 0.10 mm, and the slit width between the sheet bodies which are located within L2-L3=4.0–3.5 cm from the pen nib is 0.15 mm, and the slit width between the sheet bodies which are located within L3=3.5 cm from the pen nib is 0.18 mm. The portion between the collector and the ink tank chamber was comparted by a barrier material which has air-displacement voids whose size was smaller than any slits between the sheet bodies. The pen core which is penetrated to the collector dives further in the ink tank in a direct-liquid type pen. Then, the ink tank was filled with the ink which contained water as a main solvent and has a surface tension and density adjusted to be about 35 mN/m and about 1.08 g/ml at 25° C., respectively. Thus, a direct-liquid type writing pen containing the ink was prepared. The direct-liquid type writing pen prepared in this way gave no leak of ink when the outer pressure was changed in the writing test and the ink collector worked well as a temporary ink retaining body.

Writing Implement Comparative Example 1

According to the same way as described in Writing Implement Example 5, an untreated PP collector 1 was mounted between a PP-made ink tank chamber and a PET-made pen nib and a direct-liquid type writing pen was prepared. In the course of storing the ink into the ink collector, when the pen nib of the writing pen was oriented downwardly and the outer pressure was gradually lowered, the ink leaked from the nib and the collector did not work well.

Writing Implement Comparative Example 2

Using an untreated PP collector 2, the same test as described in Writing Implement Comparative Example 1 was carried out. The ink leaked from the pen nib and the collector did not work well.

Writing Implement Comparative Example 3

Using a PP collector 1 prepared by a well-known plasma treatment, the same test as described in Writing Implement Comparative Example 1 was carried out. The ink leaked from the pen point and the collector did not work well.

Writing Implement Comparative Example 4

Using an untreated ABS collector 2, the same test as described in Writing Implement Comparative Example 1 was carried out. The ink leaked from the pen point and the collector did not work well.

Writing Implement Example 8

Hydrophilic treatment of PP-Made Ink Tank by Modification Method 1.

Ten PP-made ink tanks were immersed in 200 ml of an aqueous Carrier 2 (5 g) solution for 5 minutes at 70° C. in order to carry out the impregnation step. Then, The treated specimens were centrifuged for one minute at a rotation rate of 1000 rpm. The impregnant seemed to be contained 2 wt. % in the treated specimens. Then, the specimens were treated by a plasma treatment for 1 minute in order to carry out the activation step. Then, the treated specimens were put in a Pyrex glass-made reaction vessel together with 120 ml of water, 10 mg of AIBN and 8 ml of methacrylic acid. After the reaction vessel was covered, the UV irradiation was made from the distance of 20 cm to the reaction vessel for two hours at 30° C. The treated ink tanks were taken out of the reaction vessel and washed with an aqueous detergent solution for 10 minutes at 60° C. and washed with water and dried.

(Evaluation)

When water or water-soluble ink were put into the obtained ink tank, the inner wall of the tank was wetted well by them. On the other hand, the untreated ink tank was not wetted at all by water or water-soluble ink, and when the untreated ink tank containing water or water-soluble ink was shaken, water or water-soluble ink went out of the tank easily. The contact angle of water was 10-30.degree for the treated ink tanks and that for untreated PET-made ink tanks was averagely 100.degree.

Writing Implement Example 9

Surface Treatment of a Pen Core and an Ink-Guiding Core by Modification Method 2.

PET-made pen cores 1 (10 pieces), pen-cores 2 (10 pieces) and ink-guiding cores (20 pieces) were immersed in 200 ml of Impregnant A for 5 minutes at 20° C. in order to carry out the impregnation step. Then, the treated specimens were rinsed with methanol centrifuged for two minutes at a rotation rate of 1000 rpm. The impregnant seemed to be contained 4 wt. % in the treated specimens. Then, the UV irradiation was made to the specimens as the activation step. Then, the specimens were dipped in an aqueous CMC solution (concentration, 10 g/L) for one hour at 80° C. and then for two hours at 40° C. The pen cores and ink-guiding cores were taken out of the reaction mixture and washed with an aqueous detergent solution for 10 minutes at boiling point, and washed with water and dried. The water absorption test was carried out for the treated specimens, untreated specimens and the specimens treated with surfactants.

(Evaluation) Untreated specimens, the specimens made by the well-known surfactant treatment and the specimens treated by the present invention were dipped in water for one minute, and the water absorbed in the specimens were squeezed and the weight increase (water absorption %) was observed. In addition, the water absorption percentages for untreated pen core 1, untreated pen core 2 and untreated ink-guiding core were 27%, 43% and 21%, respectively. All of the results for the treated specimens gave the improvement as follows; the water absorption for the treated pen core 1 was 176%, that for the treated pen core, 160% and that for the treated ink-guiding core, 61%, Actually, the pens assembled with the pen cores and ink-guiding cores treated by the method of the present invention gave an excellent ink-guiding property in the real writing test.

Writing Implement Comparative Example 5

The evaluation test for the water absorption was carried out with the pen cores and ink-guiding cores treated by surfactants. Although the initial water absorption percentage of the materials treated by surfactants was high, their water absorption property was decreased rapidly when they were washed with water at 70° C. (a process that the samples were washed with water for 5 minutes at about 70° C. with a liquor ratio of 1/100, rinsed with water and dried). Thus, the well-known surfactant treatment seemed not to be available.

Pen cores 1 treated by a surfactant; initial water absorption 70% and water absorption after washing 27%.

Pen cores 2 treated by a surfactant; initial water absorption 43% and water absorption after washing 24%.

Ink-guiding cores treated by a surfactant; initial water absorption 56% and water absorption after washing 21%.

Writing Implement Example 10

Surface Treatment of Brush Heads for a Brush Pen by Modification Method 3 Brush heads 1 (10 pieces) and brush heads 2 (30 pieces) were washed with methanol and dried. Then, the specimens were immersed in 200 ml of Impregnant D for 5 minutes. Then, the treated specimens were rinsed with methanol and centrifuged for one minute at a rotation rate of 1000 rpm. The impregnant seemed to be contained 4 wt. % in the treated specimens. Then the ozone treatment was made to the specimens for 20 minutes. The formation of the carbonyl groups in the treated specimens was not observed well by IR spectroscopy. Then, the treated brush heads were dipped in an aqueous CMC solution (100 ml) for one hour at 80° C. Then, the specimens were washed with water at 60° C. Then, the treated specimens were put in a reaction vessel containing water (120 ml), acrylic acid (6 ml) and AIBN (80 mg), and the reaction vessel was sealed with a cover and allowed to stand for 2 hours at 80° C. The specimens were taken out of the reaction mixture and washed with an aqueous detergent solution for 10 minutes at 60° C., washed with water and dried. The real water absorption test was carried out with the treated materials, untreated materials and materials treated by the well-known method with a surfactant.

(Evaluation) Untreated brush heads and the brush heads treated by the present method were put on a surface of water, and the time when the specimens were sunk in the water was observed. The material which is easily wettable gives shorter time in this observation. The results were as follows:

A brush head 1 (PBT resin-made): untreated materials=7 seconds 08, the material treated by the present method=1 second 68, A brush head 2 (nylon-made): untreated materials=11 seconds 05, the material treated by the present method=2 seconds 08, The brush heads treated by the present method gave an excellent ink-retaining property and an excellent durability as compared with untreated ones or treated ones with a surfactant.

Writing Implement Comparative Example 11

Surface Treatment of PET Fiber Stuffing for Ink-Absorbing Use by Modification Method 1

The PET fiber stuffing for the ink-retaining use (39.7 g) was taken out of the tubes which held it and washed sufficiently with water at 50° C., rinsed with water and dried. After drying, the PET fiber stuffing gave no wettability. Then, the specimen was dipped in a mixture of toluene (10 ml) with methanol (90 ml) for 5 minutes at 20° C. as the impregnation step. Then, the specimen was centrifuged for one minute at a rotation rate of 1000 rpm. Then, the same procedure as described in Writing Implement Example 1 was followed. The specimen was taken out of the reaction mixture and washed with a boiling aqueous detergent solution for 10 minutes, washed with water and dried. The real water absorption test was carried out with the treated material, untreated material and material treated by a surfactant.

(Evaluation) Untreated material (whose surfactant contained was removed by washing) and the material treated by the present method were put on a surface of water, and the time when the specimens were sunk in the water was observed. The untreated material did not sink in the water even after two hours. The material treated by the present method absorbed water and sank in the water in 15 seconds 31. The material treated by the present method gave really a good water soluble-ink retaining property.

Writing Implement Comparative Example 12

Treatment of Polyurethane-made Ink-Retaining Sponge by Modification Method 3

The improvement of hydrophilic property of polyurethane-made ink-holding sponge was carried out by the same procedure as described in Writing Implement Example 10. The water absorption test was made by the observation of the time when the specimens were sunk in the water. The polyurethane-made ink-retaining sponge treated by the present method sank in the water in 7 seconds and 46. The untreated polyurethane-made ink-retaining sponge did not sink in the water even after two hours. The water absorption property of the treated specimen gave a durable water absorption property after 5 times washing with a detergent solution.

In addition, the use of each or mixture of Impregnants A, B, C, D and F or Carriers 1 and 2 were effective for the hydrophilic treatment similarly to the above result.

Writing Implement Comparative Materials 6

The polyurethane-made ink-retaining sponge treated by a well-known plasma treatment did not give a good water absorption property and its durability as described above.

Writing Implement Comparative Example 7

The ink absorption property of the polyurethane-made ink-retaining sponge prepared by a well-known surfactant impregnation method was completely lost only by washing with water.

Writing Implement Example 13

Hydrophilic Treatment of Brush Heads 1 and 2 for a Brush Pen by Modification Method 2

Brush heads 1 (10 pieces) and brush heads 2 (10 pieces) were immersed in 200 ml of Impregnant B for 5 minutes. Then, the liquid contained in the treated specimens were removed by a centrifuge separator. When the weight increase in the specimens treated with the impregnant became to be 4 wt. % of the treated specimens, the ozone treatment was made to the specimens for 30 minutes at 20° C. as the activation step. Then, the treated specimens were put in a reaction vessel, in which a mixture of water (200 ml), KPS (60 mg), PVA (0.3 g) and methanol (6 ml) were added, and the reaction vessel was allowed to stand for 2 hours at 80° C. in order to carry out the hydrophilic polymer treatment step. After the treatment, the specimens were washed with water and an aqueous detergent solution and dried. The treated specimens gave the water absorption percentage, 500-600% and the weight increase in the specimens by the present hydrophilic treatment was 0.1%. The water absorption percentage of the specimens was not changed by three times of washing with an aqueous detergent solution.

(Evaluation) Untreated brush heads and the brush heads treated by the present method were laid on a surface of water, and the time where the specimens sank in the water was observed. The results were as follows:

A brush head 1 (PBT resin-made): untreated implements=7 seconds 08, the implement treated by the present method=1 second 78, A brush head 2 (nylon-made): untreated implements=11 seconds 05, the implement treated by the present method=3 seconds 43, The brush heads treated by the present method gave an excellent ink-retaining property and its durability when they were used for a real writing test.

Writing Implement Example 14

Surface Treatment of PET Stuffing Fiber for Ink-absorbing Use by Modification Method 1

The PET stuffing fiber for ink-retaining use (39.7 g) was washed sufficiently with water at 50° C., rinsed with water and dried. After drying, the PET stuffing fiber gave no wettability. Then, the specimen was dipped in a mixture of toluene (10 ml) with methanol (90 ml) for 5 minutes at 20° C. as the impregnation process. Then, the liquid contained in the treated specimens were removed for one minute by a centrifuge separator. The treated specimen seemed to contain the impregnant of 4% of the weight. Then the specimens were treated by the ozone treatment for 30 minutes. As the specimens were polyester, the observation of carbonyl groups by IR spectroscopy was difficult. Then, the treated specimens were put in a reaction vessel, in which a mixture of water (200 ml), KPS (60 mg), PVA (0.3 g) and methanol (6 ml) were added, and the reaction vessel was allowed to stand for 2 hours at 80° C. in order to carry out the hydrophilic polymer treatment step.

Then, as the grafting step, the treated specimens were put in a Pyrex glass-made reaction vessel together with a mixture of water (120 ml), methacrylic acid (5 ml) and AIBN (80 mg), and the reaction vessel was sealed with a cover and was allowed to stand for 2 hours at 80° C. in order to carry out the thermal polymerization. After the treatment, the specimens were taken out of the vessel and washed with an aqueous detergent solution for 10 minutes at 60° C. and water, and dried. Thus, the hydrophilic specimens were obtained. The real water absorption test was carried out with the materials obtained in this way, the untreated materials and the materials treated by a surfactant.

(Evaluation) Untreated material (of which surfactant was removed by washing) and the material treated by the present method were put on a surface of water, and the time when the specimens sank in the water was observed. The untreated material did not sink in the water even after two hours. The material treated by the present method absorbed water and sank in the water in 12 seconds 1. In addition, the material treated only by a plasma treatment did not give an effective result. The material treated by the present method gave really a good water soluble-ink retaining property.

Examples and comparative examples for the battery separator use are described below.

Battery Separator Example 1

Treatment of PP/PE Non-woven Fabric (Sample 3) by Modification Method 1

The PP/PE non-woven fabrics (Sample 3) given in Table 1 were immersed in Impregnant A for 5 minutes at 20° C. in order to carry out the impregnation step. Then, the collectors were rinsed with methanol and centrifuged for two minutes at a rate of 1000 rpm. The impregnant contained in the specimens was about 2% in weight. Then, the specimens were processed by a plasma treatment for 30 seconds as the activation step. Then, the treated specimens were put in a cylindrical reaction vessel, and water (150 ml), potassium persulfate (100 mg) and acrylic acid and (10 ml) were put in the vessel. The UV irradiation was made to the reaction vessel for two hours at 30° C. The obtained fabrics were washed in a boiling aqueous solution of a detergent for 10 minutes and washed with water and dried. The water absorption percentage of the untreated fabrics was 5%, while that of the treated fabrics was 650%. The rate of water-absorption observed for the obtained fabrics was 7.0 cm/ minute and that of the untreated fabrics was 0 cm/minute. The results of the evaluation of the chemical resistance of the obtained fabrics required for the battery separator use are described below.
1) Washing Fastness Test 1: the obtained specimens were examined by Washing Fastness Test. After drying, the water absorption percentage of the specimens was 580%, the rate of water absorption was 6.5 cm, which gave a decrease of about 10%.
2) Alkali-resistance Test: no decrease in the tensile strength of the obtained specimens was observed.
3) Acid-resistance test: no decrease in the tensile strength of the obtained specimens was observed.
4) Oxidant-resistance test: No decrease in the tensile strength of the obtained specimens was observed.

Battery Separator Comparative Example 1

An well-known nylon non-woven fabric for an alkali battery separator (FT-680N made by Japan Vilene Co. Ltd.) was prepared and examined by the same test as described in Example for writing materials 1. 1) Alkali-resistance test: after washing with water and drying, the water absorption percentage of the nylon separator decreased to 70% of the original value. 2) Acid-resistance test: after drying, the water absorption percentage of the nylon separator decreased to 60% of the original value. Its tensile strength decreased to 70% of the original value. 3) Oxidant-resistance test: after drying, the water absorption percentage of the nylon separator decreased to 60% of the original value. Its tensile strength decreased to 70% of the original value.

Battery Separator Example 2

The same procedure as described in Battery Separator Example 1 was followed, except that the PP non-woven fabric, Sample 1 in Table 1 was used and except that the ozone treatment for 30 minutes at 20° C. was carried out as the activation step.

Battery Separator Example 3

Treatment of PP non-woven fabric 3 by Modification Method 3 and its application for the lead-storage battery.

Ten sheets (weight 22 g) of PP non-woven fabric 3 (Sample 7: size 44 mm×145 mm) were immersed in Impregnant B for 5 minutes at 20° C. as the impregnation step. Then, the UV irradiation was carried out to the specimens for 20 minutes as the activation step (the distance between the UV lamp and the specimens was 10 cm, and both surfaces of each fabric were irradiated by IV). Then, the specimens were put in a stainless-steel made reaction box, in which methanol (40 ml), water (500 ml), PVA (8.0 g) and AIBN (40 mg) were put and the reaction mixture was allowed to stand for one hour at 80° C. After the treatment, the specimens were washed sufficiently with water at 60° C. Then, in order to carry out the grafting step, the specimens were put in a reaction vessel, in which methanol (20 ml), CAN (20 mg), water (500 ml) and acrylic acid (20 ml) were put, and the reaction mixture was allowed to stand for two hours at 70° C. The obtained fabrics were washed with a boiling soap (sodium salt of fatty acid) solution for 5 minutes and washed sufficiently with water and dried. The weight increase in the fabrics by the grafting was 4%. The water absorption obtained by the water absorption test for the treated fabrics was 770% and the tensile strength of the treated fabrics was 1.6 kg. The tensile strength of the untreated fabric corresponding to that used here was 1.68 kg. The chemical resistance of the fabrics necessary for the battery separator use was evaluated as follows. 1) Alkali-resistance test: the tensile strength of the obtained treated fabric was 1.42 kg. 2) Sulfuric acid-resistance test: the tensile strength of the obtained treated fabric was 1.42 kg. 3) Oxidant-resistance test: after drying, the water absorption of obtained treated fabric was 770%. Its tensile strength was 1.42 kg. The specimens treated by the present method gave good results in an absorption property of electrolytic solution, an acid-resistance, an oxidant-resistance and an alkali-resistance. They were preferable for the battery separator.

Battery Separator Comparative Example 2

A PP/PE non-woven fabric which was treated by the well-known hydrophilic treatment with a surfactant (the fabric FT-310 made by Japan Vilene Co. Ltd. impregnated with surfactants; the unit weight was similar to that of PP non-woven fabric in Table 1) was prepared and used as a battery separator. The results for the evaluation examined by the same test as described in Example for battery separators 1 are as follows. 1) Alkali-resistance test: after washing with water and drying, the water absorption percentage of the separator decreased to 10% of the original value. 2) Acid-resistance test: after sufficient washing with water and drying, the water absorption percentage of the separator decreased to 5% of the original value. 3) Oxidant-resistance test: after drying, the water absorption percentage of the separator decreased to 5% of the original value. Its tensile strength decreased to 40% of the original value.

Battery Separator Example 4

Treatment of PP Non-woven fabric 1 by Modification Method 2

The PP non-woven fabric 1 (weight 67.5 g and size 27cm×500cm), Sample 1 in Table 1 was immersed in 500 ml of Impregnant A for 10 minutes at 50° C. as the impregnation step. The specimen was centrifuged in the same procedure as Example for battery separator 1. Then, the specimen was made by the ozone treatment for 30 minutes. Then, the treated fabric was put in an Erlenmeyer flask, and methanol (200 ml), water (500 ml), PVA (6.25 g) and potassium persulfate (1.14 g) were put in the flask. The flask was allowed to stand for two hours at 80° C. After this process, the specimen was washed with a water for 10 minutes at 60° C., a boiling aqueous detergent solution and washed with water, and dried. The water absorption obtained by the water absorption test for the treated specimen was 180% and the water absorption rate was 3.5 cm/minute. That of the untreated fabric corresponding to the treated specimen was 0 cm/minute. In the alkali-resistance test, the acid-resistance test and the oxidant-resistance test, the decrease in the tensile strength of the obtained treated specimen was not observed.

Battery Separator Example 5

Treatment of PP Non-woven Fabric 2 by Modification Method 3 and its Application for the Alkali Battery and its Performance Evaluation The PP non-woven fabric 2 (weight 63 g), Sample 2 in Table 1 (size 18 cm×500 cm) was immersed in 1L of Impregnant D for 20 minutes at 40° C. as the impregnation step. Then, the specimen was centrifuged at rotation rate of 1000 rpm and the weight increase in the specimen caused by the impregnation step was about 4%. The specimen was exposed to ozone for 20 minutes as the activation step. Then, as the hydrophilic polymer treatment step, the specimen was treated with an aqueous solution (500 ml) of CMC (6.5 g) and KPS (0.5 g) four 2 hours at 80° C. The specimen was washed with water. Then, the specimen was put in a mixture of water (500 ml), CAN (0.5 g) and acrylic acid (50 ml) four two hours at 80° C. The obtained specimen was washed with a water for 10 minutes at 60° C., a boiling aqueous detergent solution and washed with water, and dried. The water absorption obtained by the water absorption test for the treated fabric was 160% and the water absorption rate was 4.0 cm/min. The water absorption of the untreated fabric was 40% and its water absorption rate was 0 cm/min. In order to see the battery separator usage, the following tests were examined. The obtained specimen did not give a decrease in water absorption percentage and a decrease in tensile strength in the alkali-resistance test, the acid-resistance test and the oxidant-resistance test. In the washing test of the obtained specimen, no decrease was observed in the water absorption percentage, the water absorption rate and the water retaining property.

Battery Separator Example 6

Preparation of Lead Storage Battery Separator by the Treatment of Glass Fiber/PP of Sample 8 by the Modification Method 2

The same procedure as Example for battery separator 4 was followed, except that the specimen of Sample 8 was used and except that the Impregnant B was used for the impregnation step.

Battery Separator Example 7

Preparation of Lead Storage Battery Separator by the Treatment of PP Non-woven Fabric 3 by the Modification Method 1

The of PP non-woven fabric 3 (weight 520 g), Sample 7 in Table 1 (size 77 mm×5 m) was used and its impregnation process was carried out in the same procedure as Example for battery separator 1. As the activation process, the specimen was exposed to ozone for 30 minutes. Then, the specimen was put in a cylindrical reaction vessel, and methanol (30 ml), AIBN (100 mg) and acrylic acid (20 ml) were added in the vessel. The thermal grafting was carried out at nitrogen atmosphere by allowing to stand it for 3 hours at 80° C. Basic experimental procedures were similar to those in Example for battery separator1. The weight increase in the specimen by grafting was 4%. The chemical resistance of the specimen necessary for the battery separator use was evaluated as follows. The obtained specimen did not give a decrease in water absorption percentage and a decrease in tensile strength in the alkali-resistance test and the acid-resistance test. The oxidant-resistance test: after sufficient washing and drying, the water absorption of the specimen was 470%. Its tensile strength was 1.47 kg. These values were not changed before and after the test.

Battery Separator Example 8

Processing of Sample 17 by Modification Method 3.

A porous PE film (Sample 17) was immersed in Impregnant E as the impregnation treatment for 10 minutes at 50° C. The specimen was treated by a plasma treatment for 30 seconds. As the polymer treatment step, the specimen was dipped in an aqueous PVA solution for one hour. The grafting to the specimen was carried out with CAN and acrylic acid by the UV irradiation for one hour at 30° C. The washing method and the evaluation of the performance were made by the same way as described in Example for battery separator 3. The obtained specimen gave the excellent property in a water absorption, a tensile strength and an alkali-resistance.

Battery Separator Example 9

Evaluation Test 1 for Alkali Battery Separator

Figure 2:
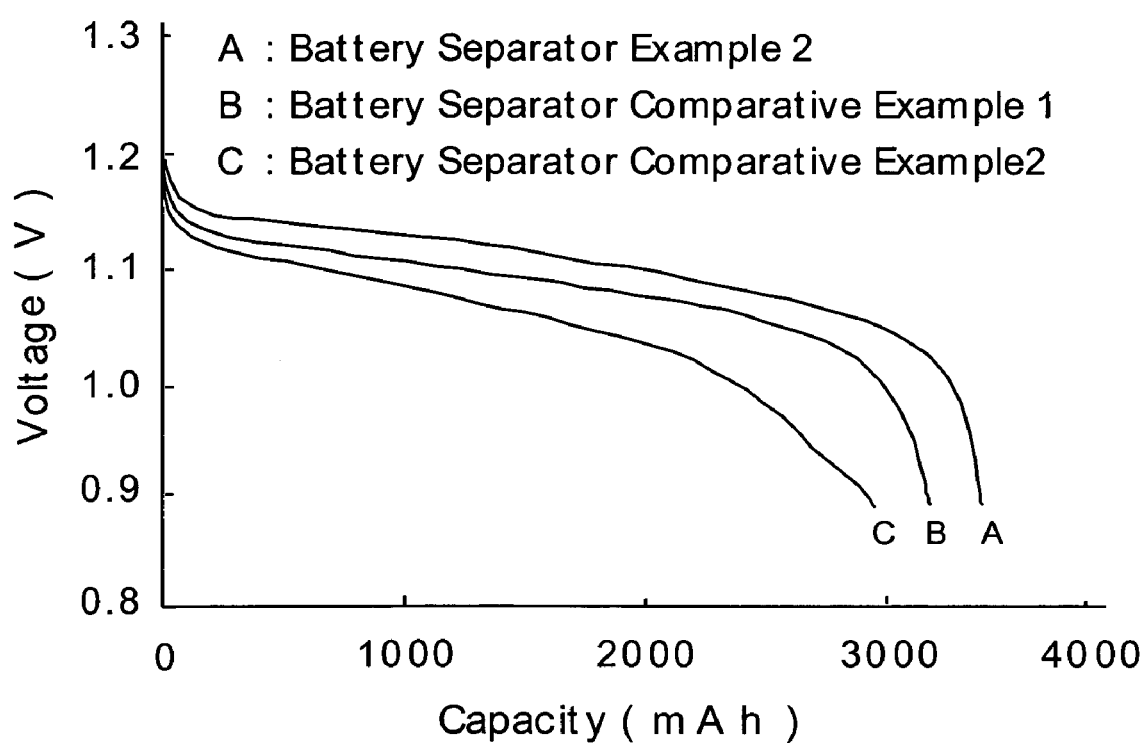
FIG. 2 gives discharge curves of the batteries assembled with various separators which were continuously overcharged.

A Ni—Cd battery (a nominal capacity: 4Ah) was made using the hydrophilic PP non-woven fabric prepared in Example for battery separator 2 as a battery separator. Similarly to this, batteries using the non-woven fabrics for battery separators obtained in Comparative Examples 1 and 2 were prepared. The charge curves for these batteries examined by a repeated overcharge at 60° C. are given in FIG. 2. The inner resistance of the battery incorporated with the non-woven fabric of the present invention was observed to be smaller than the materials obtained by Battery Separator Examples 1 and 2. In addition, the charge/discharge performance of the battery with the separator prepared by the present invention at high temperature was more excellent than that with the surfactant-impregnated polypropylene non-woven fabric prepared in Battery Separator Comparative Example 2. Besides, this property was not changed after the charge/discharge repeated five times. The separator of the present invention detached from the battery gave an excellent electrolyte absorption property (electrolytic solution absorption: 655%), but that of the surfactant impregnated PP/PE non-woven fabric of Battery Separator Comparative Example 2 gave a decrease (electrolytic solution absorption: 10%). In addition, it is well known that a nylon non-woven fabric of Battery Separator Comparative Example 1 cannot bear a long-time use.

Battery Separator Example 10

Evaluation Test for the Performance of Alkali Battery Separators 2

The evaluation test for the performance of alkali battery separators was carried out for the materials of Battery Separator Examples 1 and 3 and Battery Separator Comparative Example 2. Treated specimens were incorporated in a sealed nickel-hydrogen battery of a coin-size (a nominal capacity: 500 mAh), and nine batteries were prepared. When the property of the batteries looked stable, they were charged to 120% of the capacity by an electric source of 0.1 C (Coulomb). After four cycles of charge-discharge processes, the percentage of an average value of a residual capacity (C) to the original value for each of batteries was estimated after two weeks at 45° C. The observed values are listed in Table 3. In order to use as a preferable alkali battery separator, the hydrophilic treated material needs the excellent property in the electrolytic solution absorption, the alkali-resistance, the acid-resistance and the charge-discharge performance. As the Battery Separator Examples 1 an 2 gave an excellent electrolytic solution absorption, they are preferable for the alkali battery separators. On the other hand, the well-known surfactant-containing PP/PE non-woven fabrics gave a low electrolytic solution absorption.

Battery Separator Comparative Example 3

Durability Test of Water Absorption Property of Sample 8

Sample 8 in Table 1 is a material which is composed of glass fibers (average diameter 20 microns) bonded simply by melting polyethylene fiber (average diameter 1-2 microns) and solidified by a water-soluble adhesive. As a fact, this material is used for the lead storage batteries. This material gave a water absorption of 730%. When one sheet of Sample 8 (size 77 mm×145 mm, weight 2.64 g) was dipped in 500 ml of boiling water for 5 minutes, the fibers of the material were raveled out. Thus, it was impossible to use this material.

Battery Separator Comparative Example 4

Grafting of acrylic acid to PP/PE non-woven fabric by well-known UV irradiation

PP/PE non-woven fabric (weight 1.2 g), Sample 3 in Table 1 (size 7.7 cm×10 cm) was put in a reaction vessel containing acrylic acid monomer 20.0%, water 78.8%, benzophenone 0.2% and methanol 1.0% (each % represents weight %), and the reaction mixture was exposed by the UV irradiation for 60 minutes. After the reaction, the product was jelled with resulted polymers, but when the product was washed with a boiling aqueous soap solution for 10 minutes and washed with water, the polymers were dissolved in the washing process. The water absorption percentage of the treated non-woven fabric was 100% (that of the untreated non-woven fabric was 48%). Its grafting percentage was 1%. Namely, the well-known grafting method by the UV irradiation gave a large apparent grafting %, but the homopolymer of acrylic acid was removed from the fabric by the dissolution by washing with boiling water. The obtained specimen here was not suitable for a battery separator use, because the property of retaining electrolytic solutions was low and its durability was not preferable.

Comparative Example for Battery Separator 5

Glass fiber separater

A separator of glass fiber non-woven fabric with an acid resistance which is extensively used for a sealed-type lead storage battery was examined. This separator is impregnated with a surfactant to get a good wettablity at the initial stage. The separator is 1.0 mm thick, unit weight 342 g/m2, apparent density 0.20 g/c m$^3$, fiber diameter 10 microns, fiber length 4-8 cm, volume of vacancy 93%; it gave a water absorption of 780%.

Battery Separator Example 11

Evaluation test for the performance of a separator for lead-storage batteries

Sealed-type lead storage batteries which were incorporated with separators prepared in Battery Separator Examples 6 and 7 or a glass fiber battery separator prepared in Battery Separator Comparative Example 5 were made as a test. The sealed-type lead storage battery gave a voltage 4 V and a capacity 3.8 Ah. As a discharge test, the time when the final voltage indicated 2.8 V at a discharge current 13 A was observed. Charge-discharge tests were repeated and the result of the electrical property were listed in Table 4. In addition, the separators for the lead storage battery prepared in Battery Separator Examples 6 and 7 gave a more excellent durability.

As described in the above results, the lead storage battery used with the hydrophilic polyolefin non-woven fabric prepared by the method of the present invention gave more excellent property in a liquid-retaining, a longer life-time and a lightweight than the conventional lead storage battery.

INDUSTRIAL APPLICABILITY

As described above, various polymeric materials improved by the present invention gave an excellent water absorption property and a good adhesion property with adhesives without the decrease in strength. Besides, the property obtained by this modification gave an excellent durability. In addition, the polyolefin filter of which hydrophilic property was modified by the present invention gave a development of the use in the filtration of aqueous solutions. As the material improved by the present invention gives a water absorption property and an excellent adhesion property to synthetic papers, the improvement of printing property of them is also expected. As the adhesion property of many kinds of polymeric materials containing carbon fibers is extremely improved, hydrophilic materials available for reinforcing fibers for composite materials can be obtained by the present invention. As the hydrophilic property of various kinds of polymeric materials can be improved by the present invention, the present invention can be useful to improve the property of various kinds of medical, sanitary, or cosmetic supplies and textile products for clothing, an adhesion property of orthodontic brackets made of polymers and the wettability to water for the medical supplies or instruments.

Although the kind of polymers useful for the production of the members for writing implements such as marker pens, fountain pens, brush pens, and so forth has been limited, the prevent invention can enable to use many kinds of polymers containing polyolefins such as polypropylene, polyethylene, and so forth of which modification is considered to be difficult for the production of the writing implements. The prevent invention can give the materials having the property of a safety, an acid-resistance and an alkali-resistance, which was not seen so far.

In addition, the present invention can provide battery separators which have the excellent property in an absorption property of electrolytic solutions, an acid-resistance, an alkali-resistance and a physical strength, easily and with a cheap price. In addition, the batteries produced by using the separators prepared by the method of the present invention do not lose the excellent property for a long period.

TABLE 1

| Sample | Name | Main material | Thickness μm | Unit weight g/m² | Fiber diameter μm | Tensile Strength kg/15 mm width | Fiber length cm | Density g/cm³ | Voids % | Production method |
|---|---|---|---|---|---|---|---|---|---|---|
| 1 | PP non-woven fabric1 | PP | 150 | 50 | 12.5 | 5.35 | Continuing | 0.33 | 63 | Spun bond |
| 2 | PP non-woven fabric2 | PP | 210 | 45 | 12.5 | 1.8 | Continuing | | | Melt blow |
| 3 | PP/PE non-woven fabric | PP/PE | 300 | 76 | 6.2 | 8.03 | 3-6 | 0.25 | 72 | Heat set water slip |
| 4 | PET non-woven fabric | PET | 380 | 57 | 12.5 | | Continuing | | | Melt blow |
| 5 | PP plain fabric | PP | 120 | 150 | 20 | 1.21 | 1 | | | Warp 40/cm Weft 30/cm |
| 6 | PP/PET non-woven fabric | PP/PET | 150 | 27 | 3.6 | | 5.1 | | | Spun bond |
| 7 | PP non-woven fabric3 | PP | 1000 | 200 | 12.5 | 1.45 | 1 | 0.2 | 78 | Spun bond |
| 8 | Glass fiber/PE | Glass fiber/PE fiber | 1000 | 213 | 201-2 | 1.68 | 1-5 | 0.39 | | Heat fusing |
| 9 | Carbon fiber | Carbon fiber bundle | 150 | 50 | 1.4 | | Continuing | 0.2 | | Acrylic fiber raw material |
| 10 | Wool fiber fabric | Wool | 500 | 188 | | 8.88 | | | | |
| 11 | PP film | PP | 20 | 17 | | 2.39 | | | | Spun bond |
| 12 | PET film | PET | 60 | 72 | | 11.6 | | | | Spun bond |
| 13 | HMPE plate | Super high Mwt PE | 700 | 467 | | | | | | Average-Mwt 6 billion |
| 14 | PP synthetic paper | PP | 130 | 92 | | 17.9 | | | | White with air bubbles |
| 15 | Porous PE film | Super high Mwt PE | 60 | 30 | | 1.97 | | | | Average-Mwt 5 billion Average void size = 1 μm |
| 16 | Porous PSU film | PSU | 170 | 50 | | 0.91 | | | | Average void size = 2 μm |
| 17 | Porous PE film | Super high Mwt PE | 15 | 7.7 | | | | | | Average-Mwt 5 billion Average void size = 60 nm |

Remarks; Mwt: molecular weight

TABLE 2

| Example | Polymeric material | Impregnant process | | | Activation process | | | Grafting | | | |
|---|---|---|---|---|---|---|---|---|---|---|---|
| | | Impregnant | Temp. °C. | Time min. | Method | Temp. °C. | Time min. | Method | Monomer | Temp. °C. | Time min. |
| Example 1 | PPn.w.f.l | A | 50 | 10 | OZ | 20 | 30 | UV/CAN | AA | 30 | 2 |
| Example 2 | PPn.w.f.l | B | 50 | 10 | PL | 20 | 0.5 | UV/CAN | MA | 30 | 2 |
| Example 3 | PPn.w.f.l | F | 50 | 10 | UV | 30 | 60 | UV/CAN | AA | 30 | 2 |
| C. Exam. 1 | PPn.w.f.l | | | | | | | | | | |
| C. Exam. 2 | PPn.w.f.l | | | | OZ | 30 | 30 | UV/CAN | AA | 30 | 2 |
| C. Exam. 3 | PPn.w.f.l | | | | | | | UV/CAN | AA | 30 | 2 |
| C. Exam. 4 | PPn.w.f.l | | | | OZ | 30 | 30 | | | | |
| C. Exam. 5 | PPn.w.f.l | A | 50 | 10 | | | | UV/CAN | AA | 30 | 2 |
| Example 4 | PP Plain c. | C | 50 | 10 | PL | 30 | 0.5 | UV/CAN | AA | 30 | 2 |
| C. Exam. 6 | PP Plain c. | | | | | | | | | | |
| C. Exam. 7 | PP Plain c. | | | | PL | 30 | 0.5 | | | | |
| Example 5 | PETn.w.f. | Carrier 2 | 50 | 12 | OZ | 20 | 30 | Heat/AIBN | AA | 80 | 2 |
| Example 6 | PETn.w.f. | A | 30 | 5 | OZ | 20 | 30 | UV | MMA | 30 | 2 |
| C. Exam. 8 | PETn.w.f. | | | | | | | | | | |
| C. Exam. 9 | PETn.w.f. | | | | OZ | 20 | 30 | UV/CAN | AA | 30 | 2 |
| C. Exam. 10 | PETn.w.f. | | | | | | | UV/CAN | AA | 30 | 4 |
| C. Exam. 11 | PETn.w.f. | | | | OZ | 20 | 30 | | | | |
| C. Exam. 12 | PETn.w.f. | A | 30 | 5 | | | | CAN | MA | 80 | 2 |
| Example 7 | P/E n.w.f. | C | 50 | 10 | PL | 30 | 0.5 | UV/CAN | MA | 80 | 2 |
| Example 8 | P/E n.w.f. | E | 50 | 10 | PL | 30 | 0.5 | KPS | AA | 30 | 2 |
| C. Exam. 13 | P/E n.w.f. | | | | | | | | | | |
| Example 9 | PET film | E | 70 | 15 | OZ | 20 | 30 | UV | AA | 30 | 2 |
| C. Exam. 14 | PET film | | | | | | | | | | |
| C. Exam. 15 | PET film | | | | OZ | 20 | 30 | UV | AA | 30 | 2 |
| C. Exam. 16 | PET film | | | | | | | UV/CAN | AA | 30 | 2 |
| C. Exam. 17 | PET film | | | | OZ | 20 | 45 | | | | |
| C. Exam. 18 | PET film | E | 70 | 15 | | | | UV | AA | 30 | 2 |
| Example 10 | HMPE plate | B | 70 | 15 | OZ | 20 | 45 | UV/CAN | AA | 30 | 2 |
| C. Exam. 19 | HMPE plate | | | | | | | | | | |
| C. Exam. 20 | HMPE plate | | | | OZ | 20 | 45 | UV/CAN | AA | 30 | 2 |
| C. Exam. 21 | HMPE plate | | | | | | | UV/AIBN | AA | 30 | 2 |
| C. Exam. 22 | HMPE plate | | | | OZ | 20 | 45 | | | | |
| C. Exam. 23 | HMPE plate | A | 70 | 15 | OZ | 20 | 45 | UV/AIBN | AA | 30 | 2 |
| Example 11 | PP film | C | 70 | 15 | PL | 30 | 0.5 | UV/AIBN | AA | 30 | 2 |
| C. Exam. 24 | PP film | | | | | | | | | | |
| C. Exam. 25 | PP film | | | | PL | 30 | 0.5 | UV/AIBN | AA | 30 | 2 |
| C. Exam. 26 | PP film | | | | | | | UV/AIBN | AA | 30 | 2 |
| C. Exam. 27 | PP film | | | | PL | 30 | 0.5 | | | | |
| C. Exam. 28 | PP film | A | 70 | 15 | | | | UV/AIBN | AA | 30 | 2 |

| Example | Polymeric material | Water absorption 1% | Water absption rate mm/min. | Water absption 3% | Peel-strength of adhesion | Contact angle ° |
|---|---|---|---|---|---|---|
| Example 1 | PPn.w.f.l | 310 | 20 | 305 | | |
| Example 2 | PPn.w.f.l | 300 | 18 | 290 | | |
| Example 3 | PPn.w.f.l | 300 | 20 | 298 | | |
| C. Exam. 1 | PPn.w.f.l | 5 | 0 | 5 | | |
| C. Exam. 2 | PPn.w.f.l | 80 | 0 | 60 | | |
| C. Exam. 3 | PPn.w.f.l | 80 | 0 | 60 | | |
| C. Exam. 4 | PPn.w.f.l | 8 | 0 | 6 | | |
| C. Exam. 5 | PPn.w.f.l | 70 | 0 | 50 | | |
| Example 4 | PP Plain c. | 320 | 15 | 310 | | |
| C. Exam. 6 | PP Plain c. | 2 | 0 | 2 | | |
| C. Exam. 7 | PP Plain c. | 80 | 0 | 60 | | |
| Example 5 | PETn.w.f. | 1100 | 18 | 1000 | | |
| Example 6 | PETn.w.f. | | | | | |
| C. Exam. 8 | PETn.w.f. | 100 | 0 | 100 | | |
| C. Exam. 9 | PETn.w.f. | 400 | 5 | 350 | | |
| C. Exam. 10 | PETn.w.f. | 320 | 3 | 290 | | |
| C. Exam. 11 | PETn.w.f. | 110 | 0 | 110 | | |
| C. Exam. 12 | PETn.w.f. | 300 | 4 | 240 | | |
| Example 7 | P/E n.w.f. | 800 | 18 | 780 | | |
| Example 8 | P/E n.w.f. | 750 | 20 | 720 | | |
| C. Exam. 13 | P/E n.w.f. | 5 | 0 | 5 | | |
| Example 9 | PET film | | | 63 | 90 | 4 |
| C. Exam. 14 | PET film | | | 85 | 9 | 1 |
| C. Exam. 15 | PET film | | | 75 | 60 | 1.71 |
| C. Exam. 16 | PET film | | | 80 | 68 | 1.41 |
| C. Exam. 17 | PET film | | | 71 | 64 | 1.5 |
| C. Exam. 18 | PET film | | | 81 | 10 | 1.71 |
| Example 10 | HMPE plate | | | 76 | 220 | 167 |
| C. Exam. 19 | HMPE plate | | | 105 | 3 | 1 |
| C. Exam. 20 | HMPE plate | | | 81 | 18 | 1.3 |

TABLE 2-continued

|  |  |  |  |  |
|---|---|---|---|---|
| C. Exam. 21 | HMPE plate | 90 | 5 | 1.2 |
| C. Exam. 22 | HMPE plate | 91 | 6 | 1.1 |
| C. Exam. 23 | HMPE plate | 92 | 10 | 1.3 |
| Example 11 | PP film | 86 | 280 | 33 |
| C. Exam. 24 | PP film | 100 | 20 | 1 |
| C. Exam. 25 | PP film | 91 | 181 | 21 |
| C. Exam. 26 | PP film | 95 | 80 | 13 |
| C. Exam. 27 | PP film | 95 | 20 | 2.7 |
| C. Exam. 28 | PP film | 96 | 20 | 15 |

Remarks; C. Exam.: Comparative Example , n.w.f.: non-woven fabris, c: cloth.

TABLE 3

| Examples | Retention of electrolytic Solution at a initial stage (%) | Retention of electrolytic solution after the test (%) | Alkali-resistance (Decrease in weight (%)) | Capacity after self-discharge (%) |
|---|---|---|---|---|
| Separator Example 1 | 201 | 190 | 0.1 | 90 |
| Separator Example 2 | 160 | 160 | 0.1 | 91 |
| Separator Comparative Example 2 | 400 | 20 | 3 | 65 |

TABLE 4

| Item | Separator Example 6 | Separator Example 7 | Separator Comparative Example 5 |
|---|---|---|---|
| Hydrophilic material | Sample 8 Glass fiber/PP | Sample 7 PP | Acid-resistance Glass fiber |
| Electric resistance (ohm dm²/cell) | 0.009 | 0.0007 | 0.0009 |
| Discharge capacity at five hours high rate | 218 minutes | 241 minutes | 240 minutes |
| Discharge capacity At low temperature | 118 seconds | 132 seconds | 130 seconds |
| Voltage at 5 seconds | 1.62 V | 1.58 V | 1.57 V |
| Initial water absorption rate | 7.0 cm/minute | 5.0 cm/minute | 7.2 cm/minute |
| Water absorption rate after 3 months | 6.5 cm/minute | 5.0 cm/minute | 4.8 cm/minute |
| Initial water retension | 774% | 643% | 780% |
| Water retention after 3 months | 740% | 640% | 460% |

What is claimed is:

1. A method of modifying the surface of a polymeric surface of a polymeric material which comprises:
    (1) subjecting the polymeric material to an impregnation step to contact the polymeric material with a single or a mixture of compounds, having an impregnation property to the polymeric material in the manner so that the compound permeates in the polymeric material and the content of the impregnated compound in the layer of polymeric material within the depth of 100 micron from the surface of the polymeric material is in the range of 0.1% to 40% by weight of the treated polymeric material without any substantial deformation of the polymeric material;
    (2) subjecting the polymeric material produced in said impregnation step to an activation step to introduce carbonyl groups into the polymeric material, wherein said activation step is conducted by at least one treatment selected from the group consisting of an ozone treatment, a plasma treatment, a UV irradiation treatment, a corona discharge treatment and a high voltage electric discharge treatment; and
    (3) conducting a step of monomer grafting to the polymeric material produced in said impregnation step and subsequent said activation step, in the presence of catalysts or initiators or photo-sensitizers, wherein said steps (1), (2) and (3) are sequentially carried out.

2. A method of modifying the surface of a polymeric material which comprises:
    (1) subjecting the polymeric material to an impregnation step to contact the polymeric material with a single or a mixture of compounds, having an impregnation property to the polymeric material in the manner so that the compound permeates in the polymeric material and the content of the impregnated compound in the layer of polymeric material within the depth of 100 micron from the surface of the polymeric material is in the range of 0.1% to 40% by weight of the treated polymeric material without any substantial deformation of the polymeric material;
    (2) subjecting the polymeric material produced in said impregnation step to an activation step to introduce carbonyl groups into the polymeric material, wherein said activation step is conducted by at least one treatment selected from the group consisting of an ozone treatment, a plasma treatment, a UV irradiation treatment, a corona discharge treatment and a high voltage electric discharge treatment; and
    (3) subjecting the polymeric material produced in said impregnation step and subsequent said activation step to a step of treatment with hydrophilic polymers, in the presence of catalysts or initiators, wherein said step (1), (2) and (3) are sequentially carried out.

3. A method of modifying the surface of a polymeric material which comprises:
    (1) subjecting the polymeric material to an impregnation step to contact the polymeric material with a single or a mixture of compounds, having an impregnation property to the polymeric material in the manner so that the compound permeates in the polymeric material and the content of the impregnated compound in the layer of polymeric material within the depth of 100 micron from the surface of the polymeric material is in the range of 0.1% to 40% by weight of the treated polymeric material without any substantial deformation of the polymeric material;

(2) subjecting the polymeric material produced in said impregnation step to an activation step to introduce carbonyl groups into the polymeric material, wherein said activation step is conducted by at least one treatment selected from the group consisting of an ozone treatment, a plasma treatment, a UV irradiation treatment, a corona discharge treatment and a high voltage electric discharge treatment;

(3) subjecting the polymeric material produced in said impregnation step and subsequent said activation step to a step of treatment with hydrophilic polymers, in the presence of catalysts or initiators; and (4) conducting a step of monomer grafting to the polymeric material produced in said impregnation step, in the presence of catalysts or initiators or photo-sensitizers, subsequent said activation step and subsequent said step of treatment with hydrophilic polymers, wherein said steps (1), (2), (3) and (4) are sequentially carried out.

4. The method according to any one of claim 1 to 3, wherein said polymeric materials are in the form of any one of fibers, woven fabrics, knotted webs, non-woven fabrics, boards, rods, films, sheets, porous films, and members of products of molded materials in a given shape or composite materials with the other materials.

5. The method according to any one of clams 1 to 3, wherein said polymeric materials contain at least one or more kinds of anti-oxidants or stabilizers.

6. The method according to any one of claim 1 to 3, wherein said impregnation step is conducted at a temperature below the melting point or the softening point of the polymeric materials.

7. The method according to claim 1 or claim 3, wherein said monomer in said monomer grafting step is a compound having a carbon-carbon double bond.

8. The method according to claim 1 or claim 3, wherein said monomer is at least one monomer selected from the group consisting of acrylic acid, methacrylic acid, vinyl acetate, 2-butene acid, ethylene sulfonic acid, hydroxyalkyl acrylate, hydroxyalkyl methacrylate, acryl amide, vinyl pyridine, vinyl pyrrolidone, vinyl carbazole, maleic anhydride and pyromellitic dianhydride.

9. The method according to claim 2 or claim 3, wherein said hydrophilic polymer is at least one of the polymers selected from the group consisting of polyvinylalcohol, carboxymethylcellulose, polyhydroxy ethylmethacrylate, poly-α-hydroxy vinylalcohol, polyacrylic acid, polyvinyl pyrrolidone, polyalkylene glycols, starch, glucomannan, silk fabroin, sencin, agar, egg white and sodium arginate.

10. The method according to claim 1 or claim 3, wherein said step of monomer grafting is carried out by at least any one of or more of the following methods: (1) heating and (2) UV irradiation.

11. The method according to claim 10, wherein said initiators are at least one compound selected from the group consisting of peroxides, cerium animonium nitrate (IV), persulfates, oxidation-reduction catalysts and the other initiators for radical polymerization.

12. Polymeric material obtained by the modification method according to any one of claim 1 to 3.

13. Wiping/cleansing materials, materials for filters, water absorption materials, water retention materials, synthetic papers, medicallsanitary/cosmetic supplies, materials for medical supplies or instruments, and materials for microorganism culture media containing modified polymeric materials obtained by the modification method according to any one of claims 1 to 3.

14. Writing materials containing modified polymeric materials obtained by the modification method according to any one of claim 1 to 3.

15. Writing implements containing at least one writing material described in claim 14.

16. Dentition orthodontic appliances containing modified polymeric materials obtained by the modification method according to any one of claims 1 to 3.

17. Battery separators containing modified polymeric materials obtained by the modification method according to any one of claim 1 to 3 and batteries in which said battery separators are used.

18. The method according to claim 2 or claim 3, wherein said initiators are at least one compound selected from the group consisting of peroxides, cerium ammonium nitrate (IV), persulfates, oxidation-reduction catalysts and the other initiators for radical polymerization.

* * * * *

UNITED STATES PATENT AND TRADEMARK OFFICE
CERTIFICATE OF CORRECTION

PATENT NO. : 7,294,673 B2
APPLICATION NO. : 10/481903
DATED : November 13, 2007
INVENTOR(S) : Hitoshi Kanazawa It is certified that error appears in the above-identified patent and that said Letters Patent is hereby corrected as shown below:

Title Page item 73, delete the assignee of FiberMark Gessner GmbH & Co.

Signed and Sealed this

Fourteenth Day of April, 2009

JOHN DOLL
*Acting Director of the United States Patent and Trademark Office*